United States Patent
Flynn, IV et al.

(10) Patent No.: US 10,827,022 B2
(45) Date of Patent: Nov. 3, 2020

(54) SEMANTICS BASED CONTENT SPECIFICATION OF IOT DATA

(71) Applicant: CONVIDA WIRELESS, LLC, Wilmington, DE (US)

(72) Inventors: William Robert Flynn, IV, Schwenksville, PA (US); Hongkun Li, Malvern, PA (US); Quang Ly, North Wales, PA (US); Dale N. Seed, Allentown, PA (US); Shamim Akbar Rahman, Cote St. Luc (CA); Zhuo Chen, Claymont, DE (US); Vinod Kumar Choyi, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/064,714

(22) PCT Filed: Dec. 29, 2016

(86) PCT No.: PCT/US2016/069106
§ 371 (c)(1),
(2) Date: Jun. 21, 2018

(87) PCT Pub. No.: WO2017/117345
PCT Pub. Date: Jul. 6, 2017

(65) Prior Publication Data
US 2019/0007513 A1  Jan. 3, 2019

Related U.S. Application Data

(60) Provisional application No. 62/273,166, filed on Dec. 30, 2015.

(51) Int. Cl.
*H04L 29/08*  (2006.01)
*G06F 40/30*  (2020.01)
(Continued)

(52) U.S. Cl.
CPC ........ *H04L 67/2823* (2013.01); *G06F 16/258* (2019.01); *G06F 40/205* (2020.01);
(Continued)

(58) Field of Classification Search
CPC ........ H04L 67/12; H04L 67/28; G06F 16/258
See application file for complete search history.

(56) References Cited

U.S. PATENT DOCUMENTS 7,024,665 B2 *  4/2006  Ferraz ................ G05B 19/0426
                                              700/18
7,398,164 B2 *  7/2008  Ogushi .............. G06Q 10/0875
                                              700/105
(Continued)

FOREIGN PATENT DOCUMENTS

| EP | 1895740 A2 | 3/2008 |
| WO | 2008/069409 A1 | 6/2008 |
| WO | 2014/085624 A2 | 6/2014 |

OTHER PUBLICATIONS

"QUDT", http://www.qudt.org/pages/HomePage.html, © 2014-2019, 2 pages.
(Continued)

*Primary Examiner* — Lashonda T Jacobs
(74) *Attorney, Agent, or Firm* — BakerHostetler

(57) ABSTRACT

An M2M entity may retrieve data such that the representation of the data may consistently be returned in a form that can be dynamically specified in order to reduce complexity and overhead required by a requestor or consumer of the data. The semantic descriptions of the data that exist in the service layer may be used in order to provide desired results to the requestor or consumer of the data.

12 Claims, 21 Drawing Sheets

(51) Int. Cl.
*G06F 40/205* (2020.01)
*G06F 16/25* (2019.01)

(52) U.S. Cl.
CPC ............ *G06F 40/30* (2020.01); *H04L 67/12* (2013.01); *H04L 67/28* (2013.01)

(56) References Cited

U.S. PATENT DOCUMENTS

| | | | | |
|---|---|---|---|---|
| 7,926,065 | B2* | 4/2011 | Meadows | H04L 67/02 710/65 |
| 9,282,337 | B2* | 3/2016 | Dong | H04N 21/2343 |
| 9,471,640 | B2* | 10/2016 | Wolf | G06F 16/24568 |
| 9,800,646 | B1* | 10/2017 | Stamatakis | H04L 67/025 |
| 9,898,777 | B2* | 2/2018 | Chen | G06Q 30/0641 |
| 10,129,031 | B2* | 11/2018 | Choyi | H04L 63/061 |
| 10,129,227 | B2* | 11/2018 | Ahuja | H04L 63/06 |
| 10,299,091 | B2* | 5/2019 | Schoppmeier | H04W 4/70 |
| 10,411,959 | B1* | 9/2019 | Faibish | H04L 67/1097 |
| 10,667,229 | B2* | 5/2020 | Dong | G07B 15/063 |
| 2006/0224604 | A1* | 10/2006 | Landsman | G06F 16/904 |
| 2009/0276525 | A1* | 11/2009 | Jo | H04L 67/2823 709/224 |
| 2010/0049701 | A1* | 2/2010 | Miller | G06F 16/258 715/236 |
| 2013/0324121 | A1* | 12/2013 | Kwon | H04W 4/70 455/435.1 |
| 2014/0215043 | A1* | 7/2014 | Ryu | G06F 16/955 709/223 |
| 2014/0344269 | A1* | 11/2014 | Dong | H04L 67/12 707/736 |
| 2014/0359035 | A1* | 12/2014 | Wang | H04L 51/06 709/206 |
| 2015/0066926 | A1* | 3/2015 | Dubois | G16H 40/63 707/737 |
| 2015/0067176 | A1* | 3/2015 | Dubois | G06F 19/3418 709/227 |
| 2015/0189005 | A1* | 7/2015 | Dubois | H04L 63/10 709/217 |
| 2015/0226587 | A1* | 8/2015 | Miry | G06K 19/06037 702/57 |
| 2015/0321459 | A1* | 11/2015 | Frisch | B32B 37/10 156/497 |
| 2015/0381486 | A1* | 12/2015 | Xiao | H04L 41/12 370/237 |
| 2016/0004767 | A1* | 1/2016 | Song | G06F 16/951 707/769 |
| 2016/0019294 | A1* | 1/2016 | Dong | G06F 16/367 707/794 |
| 2016/0048573 | A1* | 2/2016 | Muttik | H04W 4/70 707/737 |
| 2016/0179063 | A1* | 6/2016 | De Baynast De Septfontaines | H04L 41/0853 700/11 |
| 2016/0295346 | A1* | 10/2016 | Iwai | H04L 69/08 |
| 2017/0063931 | A1* | 3/2017 | Seed | H04L 63/10 |
| 2017/0105111 | A1* | 4/2017 | Li | H04W 8/005 |
| 2017/0134536 | A1* | 5/2017 | Tessiore | H04L 67/2823 |
| 2017/0160110 | A1* | 6/2017 | Basu | G01D 1/16 |
| 2017/0187585 | A1* | 6/2017 | Yew | H04L 43/04 |
| 2017/0187642 | A1* | 6/2017 | Nolan | H04L 67/2852 |
| 2017/0187807 | A1* | 6/2017 | Clernon | H04L 41/0806 |
| 2017/0208139 | A1* | 7/2017 | Li | H04W 4/70 |
| 2017/0310767 | A1* | 10/2017 | Flynn, IV | H04L 67/125 |
| 2018/0101144 | A1* | 4/2018 | Fuger | G06F 11/3409 |
| 2018/0177777 | A1* | 6/2018 | Ballek | A61K 9/16 |
| 2018/0278710 | A1* | 9/2018 | Sun | G06F 16/951 |

OTHER PUBLICATIONS

Barnaghi et al., "A Linked-data Model for Semantic Sensor Streams", 2013 IEEE International Conference on Internet of Things, Aug. 2013, 8 pages.

OneM2M TS-0001 V1.0.1 Technical Specification, "Service Layer Core Protocol Specification" Jan. 20, 2015, 217 pages.

OneM2M TS-0001 V2.3.0 Technical Specification, "Functional Architecture", Aug. 7, 2015, 352 pages.

OneM2M TS-0007 V0.1.0 Technical Specification, "Service Component Architecture", Feb. 22, 2014, 17 pages.

* cited by examiner

SEMANTICS BASED CONTENT SPECIFICATION OF IOT DATA

CROSS-REFERENCE TO RELATED APPLICATIONS

This application is a National Stage Application filed under 35 U.S.C. 371 of International Application No. PCT/US2016/069106, filed Dec. 29, 2016, which claims the benefit of U.S. Provisional Patent Application Ser. No. 62/273,166, filed on Dec. 30, 2015, entitled "Semantics Based Content Specification of IoT Sensor Data,", the contents of which are hereby incorporated by herein.

BACKGROUND

M2M Service Layer: From a protocol stack perspective, service layers are typically layered on top of application protocol layer and provide value added services to client applications. Hence service layers are often categorized as 'middleware' services. For example, FIG. 1 shows an exemplary service layer 101 in between an IP networking stack 102 and applications 103.

An example deployment scenario of a service layer instances within a network is shown in FIG. 2. In FIG. 2, the service layer instances 105 are shown deployed on various network nodes (gateways and servers) and providing value-added services to network applications found in network application domain 106, device applications found in device application domain 107, as well as to the network nodes found in network services domain 108, for example. Service layer instance 105 is a realization of a service layer.

An M2M/IoT service layer is an example of one type of service layer specifically targeted towards providing value-added services for M2M/IoT type devices and applications. Industry standards bodies (e.g. oneM2M-oneM2M Functional Architecture, oneM2M-TS-0001 oneM2M Functional Architecture-V-2.1.0) has been developing M2M/IoT service layers to address the challenges associated with integration of M2M/IoT types of devices and applications into deployments such as the Internet/Web, cellular, enterprise, and home network. An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer. Another example of a Service Layer is the IP Multimedia Subsystem (IMS) Service Layer specifically targeted to providing multimedia services for mobile network devices.

oneM2M develops technical specifications that address the need for a common M2M Service Layer that can be readily embedded within various hardware and software, and relied upon to connect a wide variety of devices in the field with M2M application servers worldwide.

The oneM2M common services layer supports a set of Common Service Functions (CSFs) (e.g., service capabilities), as shown in FIG. 3. An instantiation of a set of one or more particular types of CSFs is referred to as a common services entity (CSE) (e.g., CSE 109), which can be hosted on different types of network nodes (e.g., infrastructure node, middle node, application-specific node).

The M2M Service Architecture described in oneM2M Service Component Architecture, oneM2M-TS-0007 Service Component Architecture-V-0.1.0, and shown in FIG. 4, augments the oneM2M Functional Architecture by specifying M2M services provided to M2M application and M2M Service Providers. Service exposure component 113 exposes services to AEs 112. Network service utilization component 115 consumes services from NSE 118. Remote service exposure 116 connects services from different M2M environments.

Semantic Annotation of Sensor Data

Sensors are widely deployed in our environment, everywhere from temperature sensors on building, traffic sensors on roads, to motion sensors inside buildings, and many other examples. With the introduction of more M2M and IoT services, the problem of how to describe sensor data is appearing more frequently. The Resource Description Framework (RDF) is a framework for representing information in the Web. RDF is essentially a data-model. Its basic building block is a resource-property-value triple, called a statement. Below is an RDF example of a temperature sensor where the sensor data includes additional meta-data related to that measurement, such as location, time and unit.

```
-<rdf: RDF>
    -<rdf: Description rdf: about="kppvc5dv6ds9b7bf032322ae45>
        <wot: type> http://dbpedia.org/resource/Heat_sensor</wot:type>
        <wot:location>kppvc5dv6ds9</wot:location>
        <wot:time>1361891908203</wot:time>
        <xs:datatype>xsdint</xs:datatype>
        -<wot:unit>
            "http://sweet.jpl.nasa.gov/ontology/units.owl#degreeC
        </wot:unit>
        <wot:uri/>
    </rdf:Description>
</rdf:RDF>
```

QUDT is short for Quantities/Units/Dimensions/Types. QUDT is an ontology that addresses problems related to aligning quantitative data from multiple sources. In order to support operations of wide sets of data there needs to be a method to ensure the quantities are commensurate with each other and how to convert from one system to another. For example a length of 10 centimeters is not the same as 1 foot. But the QUDT ontology allows us to specify that they are both measures of length, and then the ability to convert from one length to the other.

The QUDT ontology was developed by NASA as part of the Constellation Program. It was developed for science and engineering purposes.

In an example, Table 1 and Table 2 show the QUDT definitions for Temperature units of ° C. and ° F.

TABLE 1

| QUDT definition for DegreeCelsius | |
| --- | --- |
| Property | Value |
| qudt:abbreviation | degC |
| qudt:code | 0515 |

TABLE 1-continued

QUDT definition for DegreeCelsius

| Property | Value |
| --- | --- |
| qudt:conversionMultiplier | 1 |
| qudt:conversionOffset | 273.15 |
| qudt:quantityKind | quantity:ThermodynamicTemperature |
| qudt:symbol | degC |

TABLE 2

QUDT definition for DegreeFahrenheit

| Property | Value |
| --- | --- |
| qudt:abbreviation | degF |
| qudt:code | 0525 |
| qudt:conversionMultiplier | 0.5555555555555555556E0 |
| qudt:conversionOffset | 255.37037037037037037E0 |
| qudt:quantityKind | quantity:ThermodynamicTemperature |
| qudt:symbol | degF |

Using QUDT to create RDF triples describing data and storing them in a triple store allows user to query the triple store. SPARQL is the standard query language for accessing RDF data. The following SPARQL select query can convert from ° C. to ° F., where 22° C. is the input temperature.

```
SELECT (((((22 * ?multiplier1) + ?offset1) − ?offset2) / ?multiplier2)
AS ?value)
WHERE {
    unitDegreeCelcius qudt:conversionMultiplier ?multiplier1 ;
    qudt:conversionOffset ?offset1 .
    unitDegreeFahrenheit qudt:conversionMultiplier ?multiplier2 ;
    qudt:conversionOffset ?offset2 .
}
```

The result in Degrees Fahrenheit is 71.6

SUMMARY

Disclosed herein are methods for an M2M entity to retrieve data such that the representation of the data may consistently be returned in a form that can be dynamically specified in order to reduce complexity and overhead required by a requestor or consumer of the data. The semantic descriptions of the data that exist in the service layer may be used in order to provide desired results to the requestor or consumer of the data. The description of a measurement may also be accompanied by the measurement itself, which allows for the description of data as post processing or pre-processing.

In a first example, a method is defined for creating a content descriptor (e.g., a semantic descriptor) using semantic annotation. In a second example, a method is defined to store the content descriptor as meta-data for the data content so that it can be retrieved separately. In a third example, a method is defined to allow entities to specify a desired content descriptor for data received from the M2M Service Layer. In a third example, a method is defined for the Service Layer to compare the desired content descriptor and the current content descriptor. In a fourth example, a method is defined for the service layer to return requested data in a form that matches the desired semantic description provided by the requesting entity.

By using the disclosed methods, an M2M entity may only need to know how to process retrieved data in a single representation while operating in an environment where the same type of data can be represented and provided in multiple representations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

In M2M systems, sensors or other sources generate data and make the data available to consumers of that data. Conventionally, a consumer of the data should have an understanding of how the data is represented in order to make use of the data for display, storage, or calculation. There may be many sources of the same type of data, such as temperature sensors. These temperature sensors may provide the data in any number of different representations.

Figure 1:
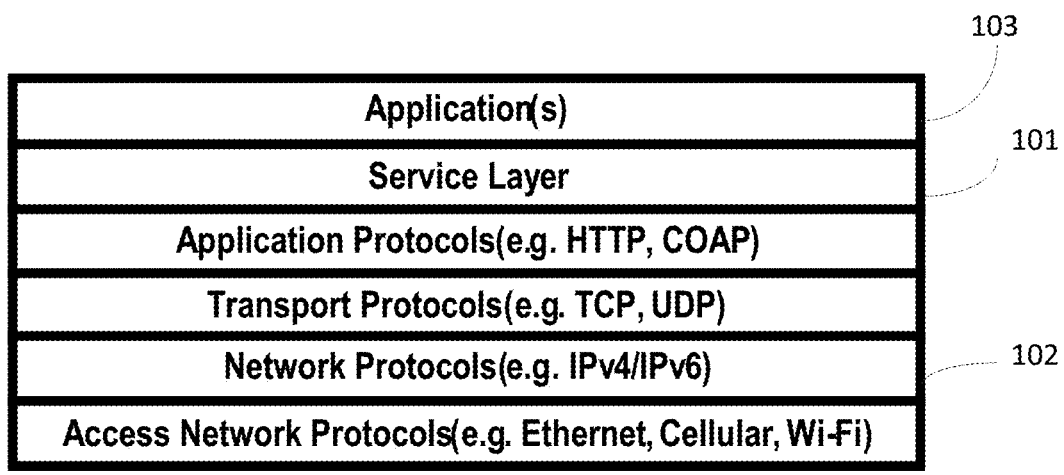
FIG. 1 illustrates an exemplary service layer in between an IP networking stack and applications.
Figure 2:
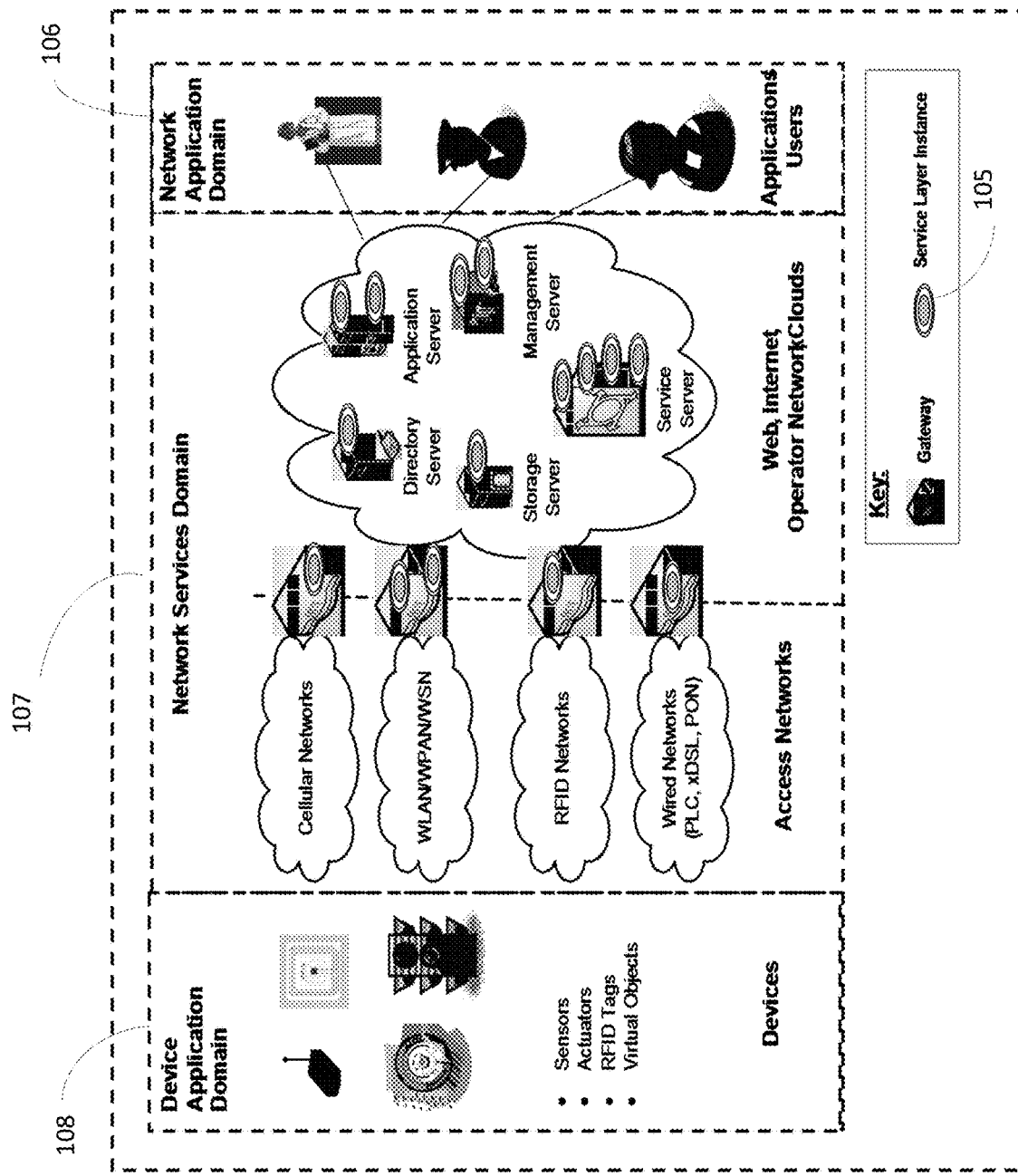
FIG. 2 illustrates an exemplary deployment scenario of a service layer instances within a network.
Figure 3:
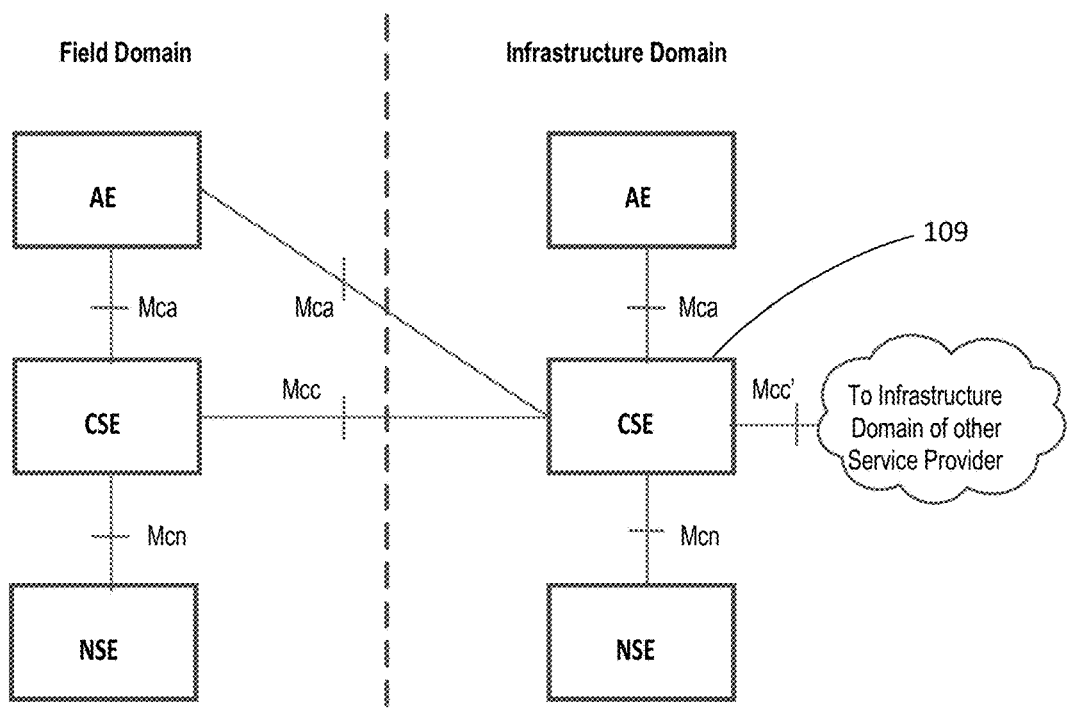
FIG. 3 illustrates an exemplary oneM2M service layer functional architecture.
Figure 4:
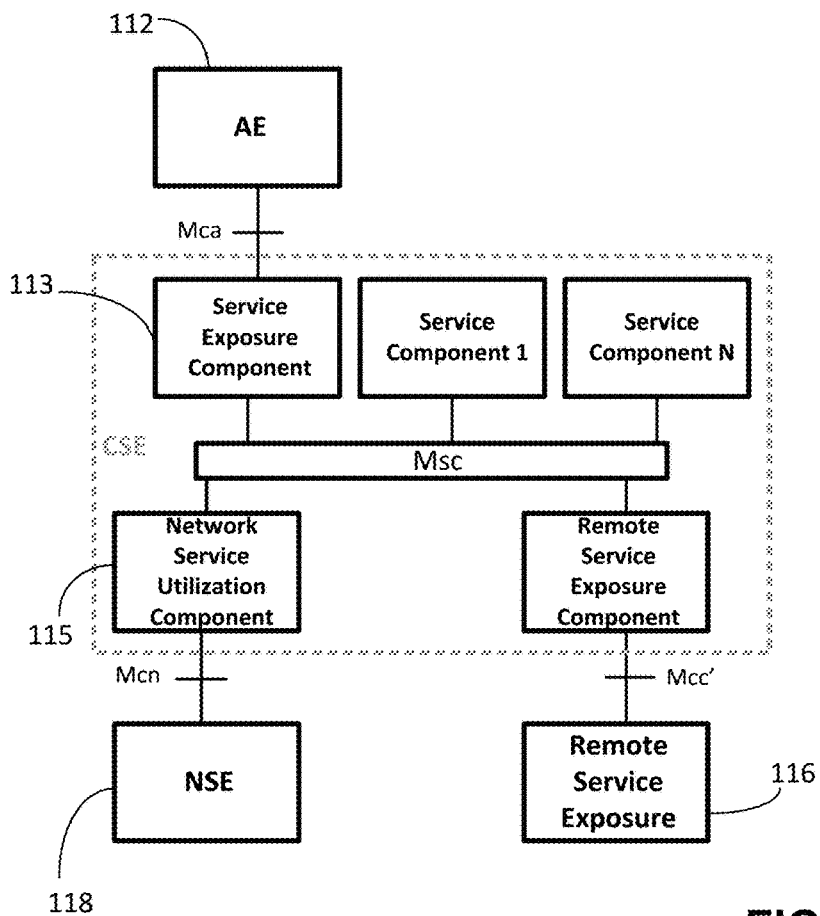
FIG. 4 illustrates an exemplary oneM2M services architecture.
Figure 5:
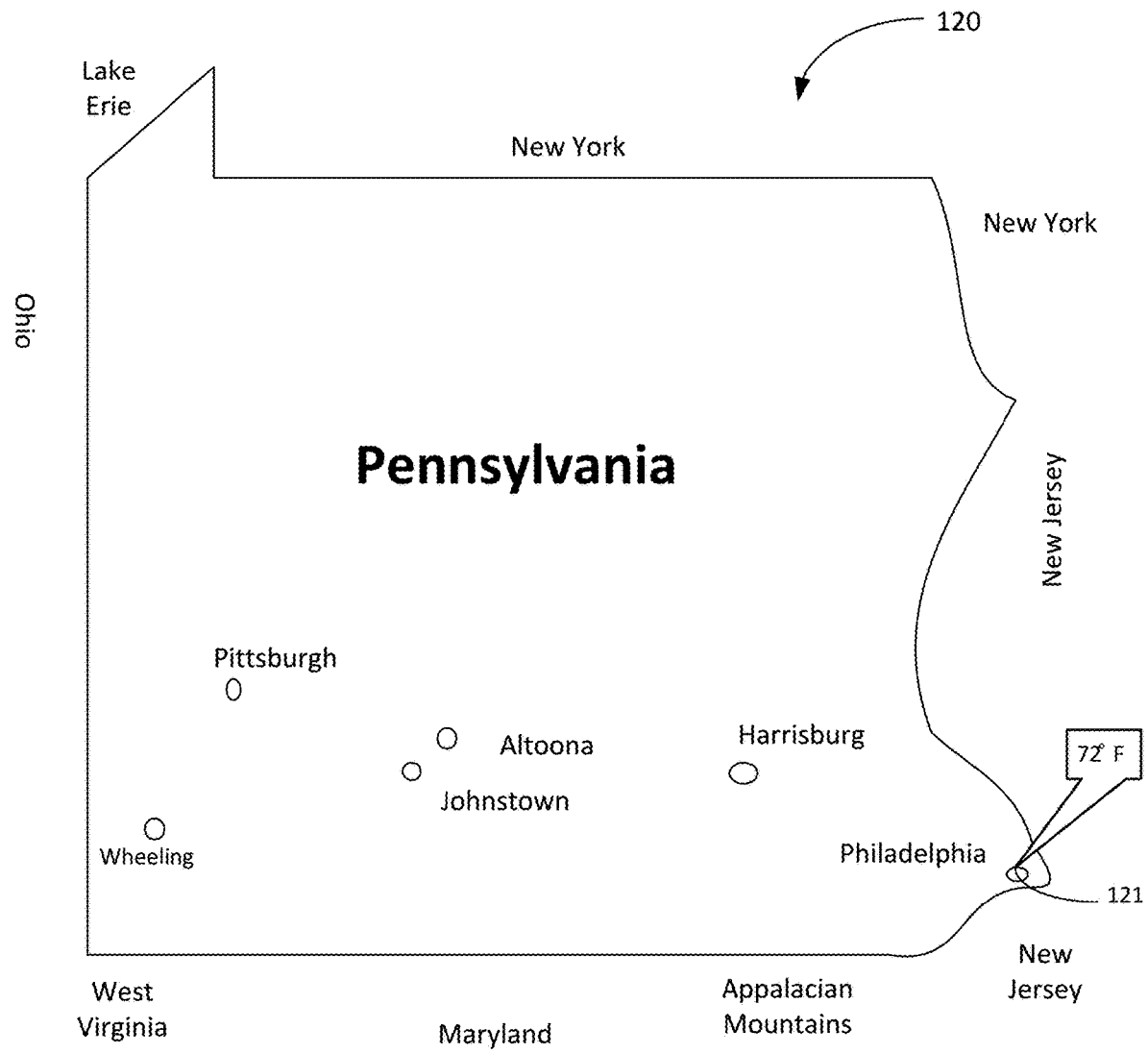
FIG. 5 illustrates an application display associated with a single format.

To illustrate an issue with the conventional systems, an application may be defined that can display temperature values from sensors. The application discovers temperature measurements and retrieves the measurements from a M2M service layer. One particular temperature sensor may provide temperature measurements in units of degrees Fahrenheit. The consumer of this sensor data will need to know how this measurement is represented in order to display it properly. FIG. 5 illustrates an example application display with a single type format. The sensor provides content "72" (the temperature at source 121) so that it may be displayed as "72° F.".

Figure 6A:
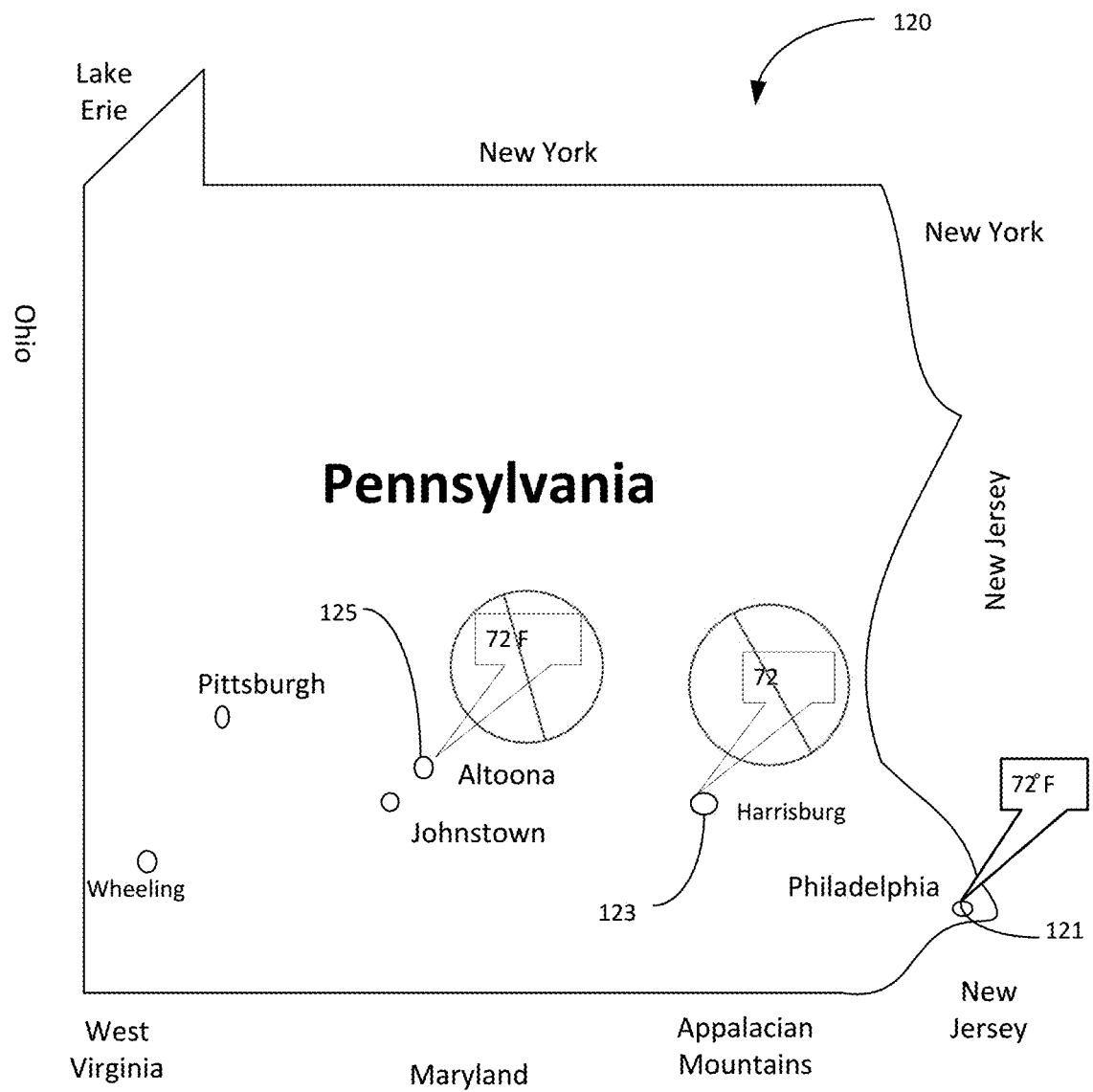
FIG. 6A illustrates an application display associated with multiple formats.
Figure 6B:
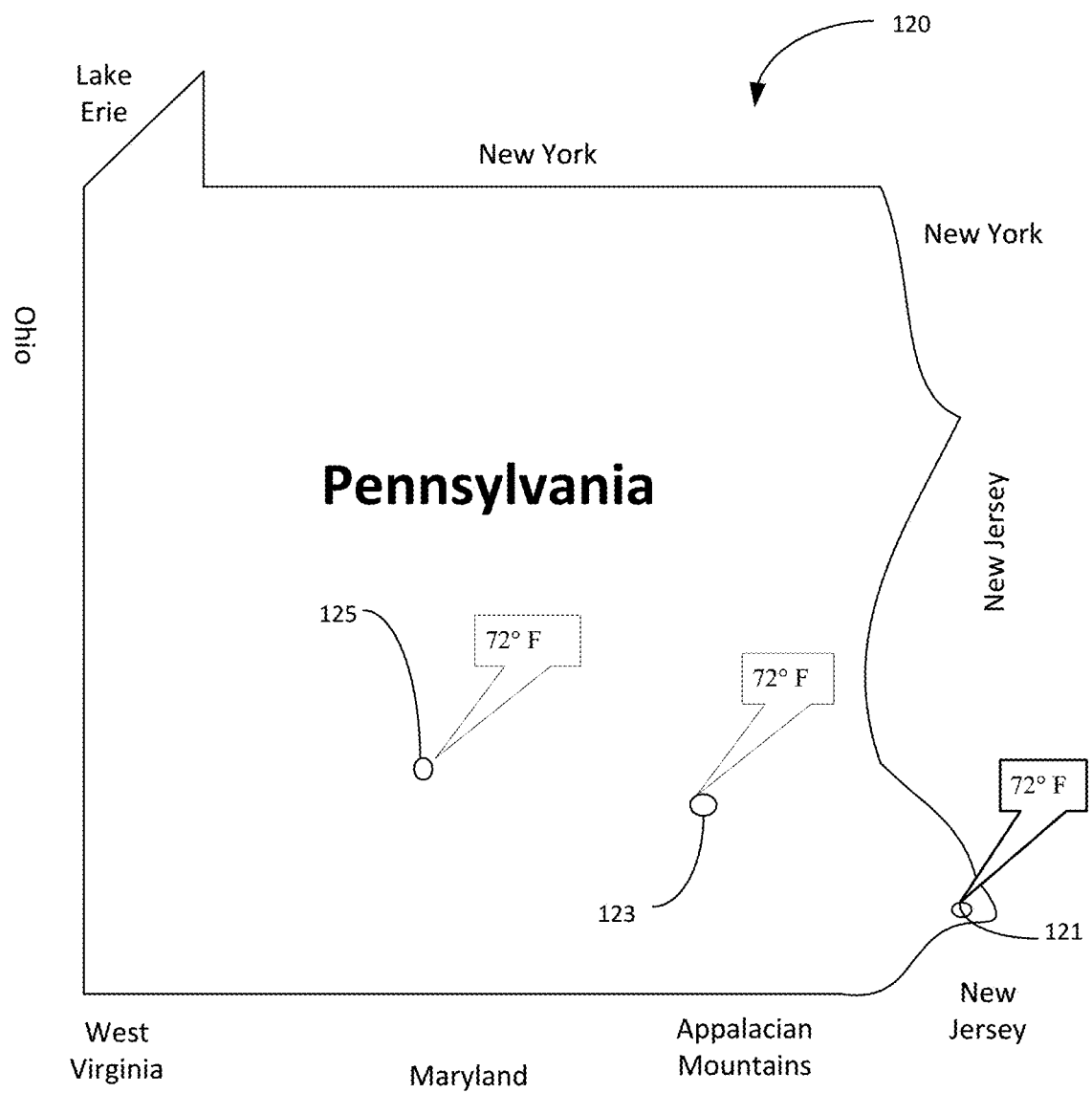
FIG. 6B illustrates an application display associated with multiple formats.

FIG. 6A illustrates an example application display of multiple formats. For example, sensors at source 121, source 123, and source 125 may also provide the temperature measurements in other representations as well, such as "72° F.," "72," or "72 F," respectively, while temperature output associated with an application may want the temperature to be displayed on display 120 as "72° F." As shown in FIG. 6A, the displayed temperature of source 123 ("72") and source 125 ("72 F") are not displayed in the desired format temperature of 72° F. FIG. 6B illustrates an example of display 120 displaying a single format, but has multiple formats (e.g., data content) generated by one or more sensors. By providing a semantic description of the data content, as described herein, the representation of the data may be described so that display 120 can properly display the different data content in each case, as shown in FIG. 6B. oneM2M, for example, does not have a way to understand the content of the data. So while the content could be a simple "72," sensors that use the conventional methods of oneM2M do not properly display the content.

Figure 7A:
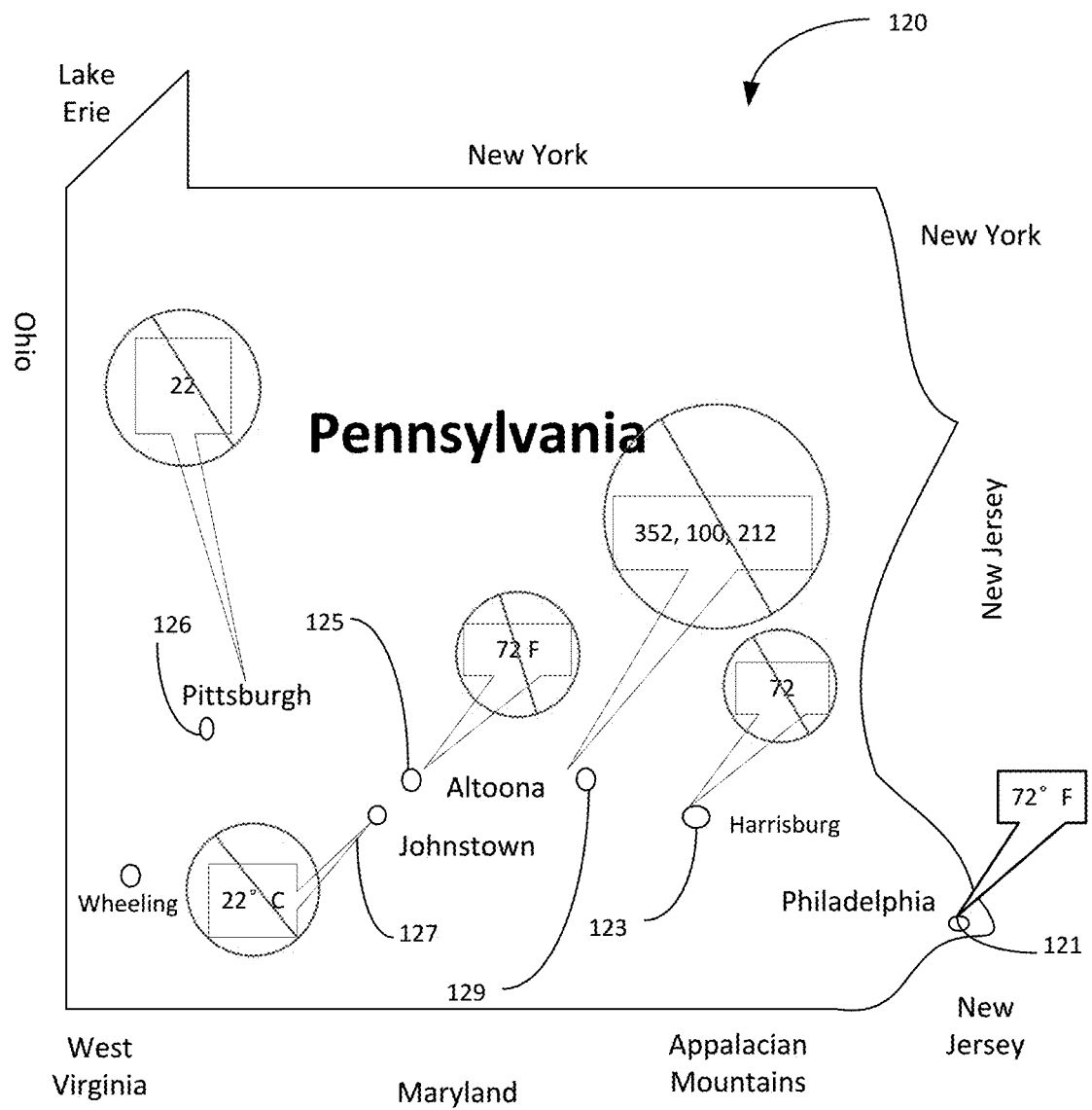
FIG. 7A illustrates an exemplary application display with multiple units.
Figure 7B:
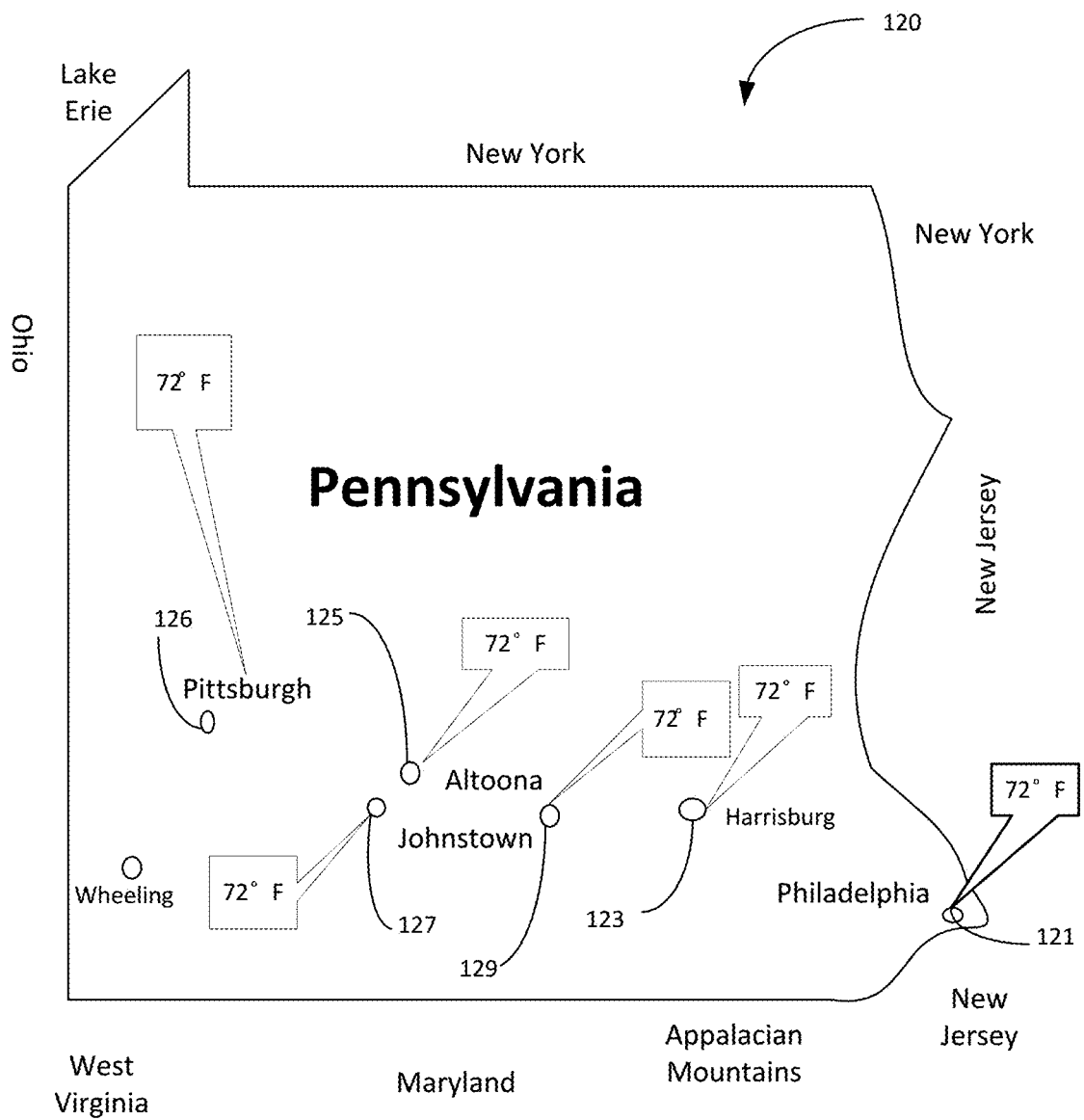
FIG. 7B illustrates an exemplary application display that shows a standard representation of a temperature, which is based on different underlying units of measurement.

Additionally, sensors may use different units for measurements. For example, other temperature sensors may provide measurements in degrees Celsius, while various other temperature sensors provide outputs in Ohms (thermistor) or using a digital scale (e.g. 0-1023) that have to be converted to the desired units of measurement. Some sensors may provide additional data, such as humidity and light measurements, in addition to the temperature values. In these cases, the semantic description provided allows an application associated with display 120 to convert to the desired representation and if necessary remove unwanted data, as shown in FIG. 7A and FIG. 7B. FIG. 7A illustrates an exemplary application display with multiple units. FIG. 7B illustrates an exemplary display 120 that shows a standard representation of a temperature, which is based on different underlying units of measurement shown in FIG. 7A and further exemplified in Table 3.

TABLE 3

| Source | Data Content | Display 120 |
|---|---|---|
| Source 121 | 72 | 72° F. |
| Source 123 | 72 F. | 72° F. |
| Source 125 | 72 F. | 72° F. |
| Source 126 | 22 | 72° F. |
| Source 127 | 22° C. | 72° F. |
| Source 129 | 352, 100, 212 | 72° F. |

If all the received sensor data (e.g., data content) has the same representation, such as when the format is standardized, an application associated with display 120 is strictly focused on the business logic of the application, e.g., displaying temperature measurements. However, since M2M service layer architectures, such as oneM2M, enable easy data sharing between various verticals (industry, vehicular, agriculture, etc.). Different verticals usually mean different data content received. So problems may arise when entities desire to share data that is represented in even a slightly different manner with other entities. For conventional systems, in order to leverage such data across different verticals, each entity, or data consumer (e.g., application) would 1) identify the representation of the data content; and 2) translate data to the desired representation. <INVENTOR: Please verify that the aforementioned sentence is correct>

The temperature examples given so far are simple, but quickly show how this problem can become difficult to solve by conventional systems. Identification of the representations of the data can become highly complex and does not scale efficiently when more new representations are discovered. Translation of the data into the desired representation creates additional overhead for the consumers of the data (e.g., an application).

When an application (e.g., a consumer of M2M data) retrieves data, it extracts the desired data from a response provided by the M2M Service Layer. Disclosed herein are methods by which data can be described. These descriptions can be made available to an application. Once an application understands the representation of the data provided, it may process the data to put it into a representation needed for an application specific purpose. This can be a repetitive process that may be performed by the M2M service layer using the methods herein, such as content conversion. If the M2M data provided has extra information or information that is captured in resource metadata, other methods, such as content restructuring described herein, may be used. Content restructuring describes how the M2M service layer can perform additional processing of the data to restructure the response to match the specific purpose of an application.

Content Description

M2M Service layers commonly allow devices to store any type of information on the service layer in its data repository. In some cases the data is opaque or unknown to the service layer. In order to allow the service layer to provide advanced services to M2M endpoints, it may be necessary to provide a description of the data representation. This description can also be made available to the M2M endpoints for processing the data provided by another M2M endpoint, such as when discovery procedures are used to find certain types of resources, like the temperature values described with regard to FIG. 5 through FIG. 7B. Below are methods for describing sensor data without adding overhead to that of the actual sensor measurement.

Figure 8:
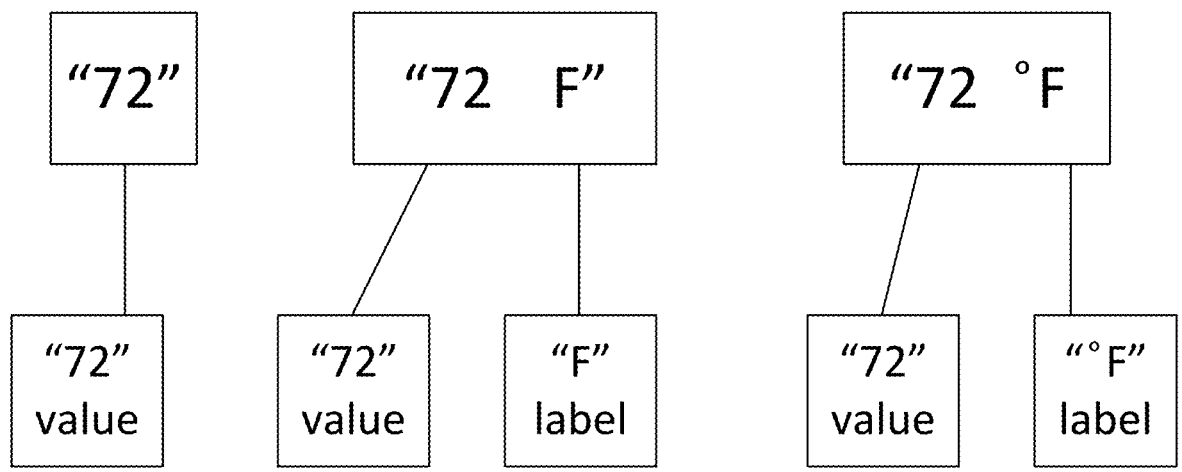
FIG. 8 illustrates components of the contents of each of the sensor measurements from multiple sources.
Figure 9:
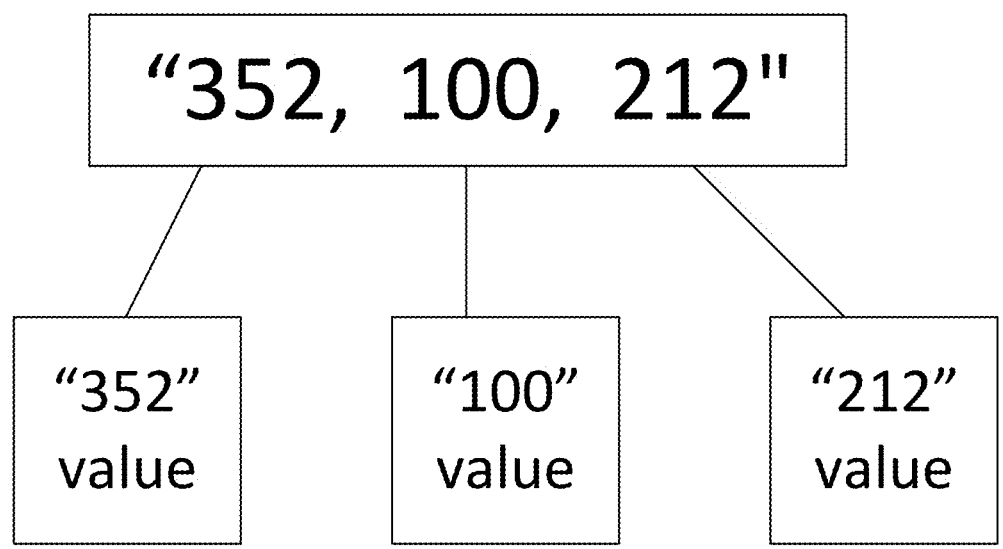
FIG. 9 illustrates components of the contents of sensor measurements from a source.

FIG. 8 illustrates components of the contents of each of the sensor measurements from source 121, source 123, and source 125. Sources 126 and source 127 are similar. FIG. 9 illustrates components of the contents of sensor measurements from source 129. Defined herein is a method to describe the content from each source, without the need to add additional information to the data itself.

There are two components of the sensor measurement contents found in the various sensor sources used: "value [Type]" and "label", as shown in FIG. 8. An optional component "unit" can be used in cases where the content field does not specify a unit as part of the label. FIG. 9 extends the measurement definition to describe a content that contains one or more measurements separated by a "delimiter." FIG. 10 illustrates an exemplary RDF schema for the relationships of FIG. 8 and FIG. 9.

Figure 10:
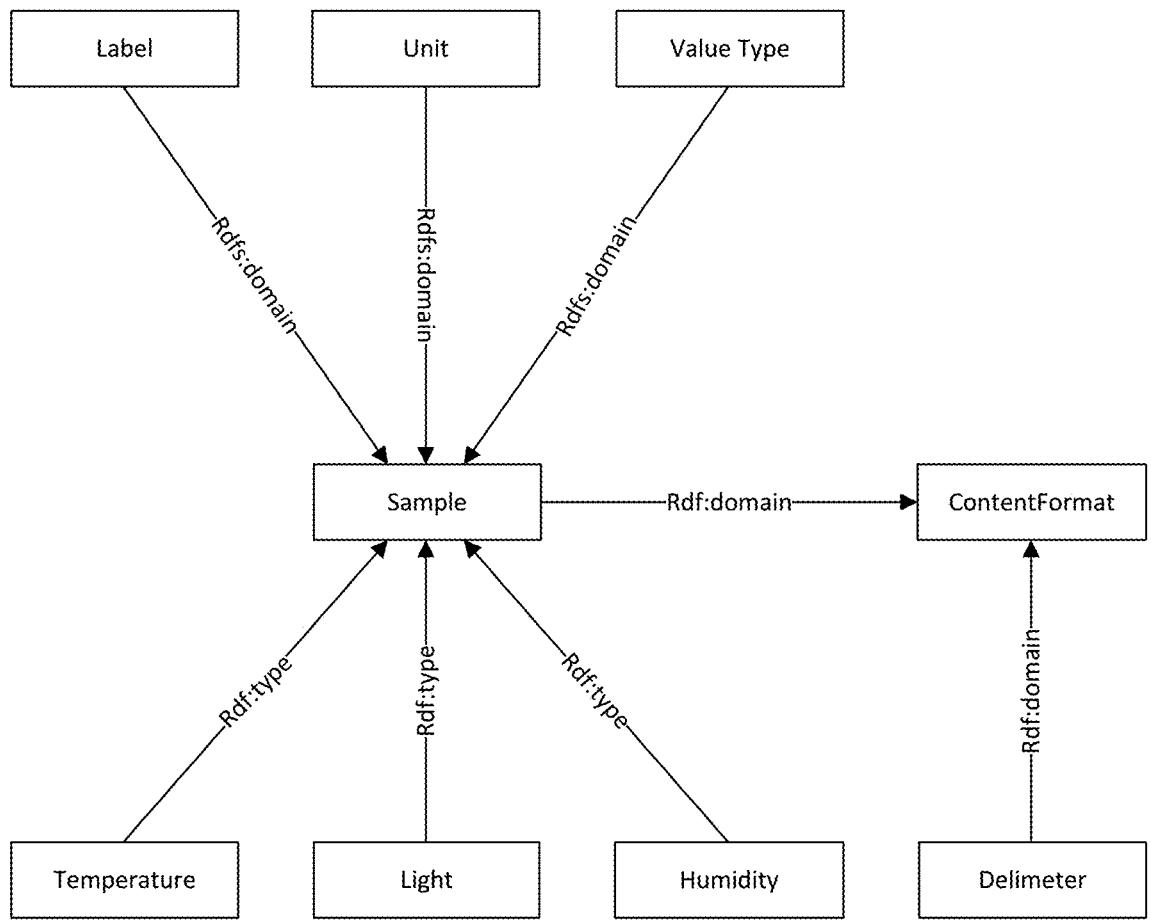
FIG. 10 illustrates an exemplary RDF schema for disclosed relationships.

Table 4 and Table 5 shows how relationships as shown in FIG. 9 and FIG. 10 can be described using an XML schema and turtle format, respectively.

TABLE 4

XML

```
<xs:schema>
    <xs:complexType name="contentFormat">
        <xs:sequence>
            <xs:element name="delimiter" type="xs:char"
            maxOccurs="1"/>
            <xs:element name="measurement" type="ex:measurement"
            minOccurs="1"/>
        </xs:sequence>
    </xs:complexType>
    <xs:complexType name="measurement">
        <xs:sequence>
            <xs:element name="label" type="xs:char"
            minOccurs="0"
            maxOccurs="1"/>
            <xs:element name="valueType" type="xs:char"
            minOccurs="1"
            maxOccurs="1"/>
            <xs:element name="unit" type="xs:char"
            minOccurs="0"
            maxOccurs="1"/>
        </xs:sequence>
```

TABLE 4-continued

XML

```
    </xs:complexType>
</xs:schema>
```

TABLE 5

```
ex:contentFormat a rdfs:Class .
ex:delimiter a rdf:Property ;
    rdfs:domain ex:contentFormat ;
    rdfs:range xsd:char ;
    rdfs:comment "delimiter that separates multiple measurements" .
ex:measurement a rdf:Property ;
    rdfs:domain ex:contentFormat ;
    rdfs:range ex:sample;
    rdfs:comment "Sensor Measurement Value" .
ex:sample a rdfs:Class .
ex:unit a rdf:Property ;
    rdfs:domain ex:sample ;
    rdfs:range rdfs:Literal;
    rdfs:comment "unit of the value" .
ex:hasValueType a rdf:Property ;
    rdfs:domain ex:sample ;
    rdfs:range rdfs:Literal ;
    rdfs:comment "Sensor Measurement Type i.e. integer, string, char" .
ex:label a rdf:Property ;
    rdfs:domain ex:measurement ;
    rdfs:range xsd:token ;
    rdfs:comment "characters that accompany the measured value" .
```

The "unit" can be a link to a semantic description. If both a "unit" and a "label" are provided then the unit is used for mathematical calculations while the "label" is used to parse the content field. If only a "label" is applied, then it may also be used to for mathematical calculations. If only a label is provided, it may be checked to see if it contains a description of the unit of measure, such as "F". The "unit" may be specified directly as well, such as "unit:DegreeFahrenheit," which is a term that can be looked up. In this case, the label may be used in a display, and "unit" used in calculations. Table 6 shows semantic descriptions of the sources of data shown in the use-case described above. The "unit" element can be a complete specification, such as "<unit>F</unit>" shown for source 121, or it can be a URI that points to a description, such as "<unit>uri1</unit>" shown for source 126. Note that the semantic descriptions typically do not include actual sensor measurements, only a description of the measurement representation.

TABLE 6

| Source | XML | RDF |
|---|---|---|
| 121 | \<contentFormat\><br>  \<measurement\><br>    \< valueType \>xs:integer\< valueType /\><br>    \<unit\> unit:DegreeFahrenheit \</unit\><br>  \</measurement\><br>\</contentFormat\> | resIdURI /rdf:type ex:contentFormat;<br>  /ex:measurement temperature.<br><br>temperature /rdf:type ex:sample;<br>  /ex:unit unitDegreeFahrenheit;<br>  /ex:hasValueType xs:integer. |
| 123 | \<contentFormat\><br>  \<measurement\><br>    \<label\>F\<label/\><br>    \< valueType \>xs:integer\< valueType /\><br>  \</measurement\><br>\</contentFormat\> | resIdURI /rdf:type ex:contentFormat;<br>  /ex:measurement temperature.<br><br>temperature /rdf:type ex:sample;<br>  /ex:label "F";<br>  /ex:hasValueType xs:integer. |
| 125 | \<contentFormat\><br>  \<measurement\><br>    \<label\>°F\<label/\><br>    \< valueType \>xs:integer\< valueType /\> | resIdURI /rdf:type ex:contentFormat;<br>  /ex:measurement temperature.<br><br>temperature /rdf:type ex:sample;<br>  /ex:label "°F"; |

TABLE 6-continued

| Source | XML | RDF |
|---|---|---|
| | <unit>http://vendor.com/tempToDegreesF</unit><br>    </measurement><br></contentFormat> | /ex:hasValueType xs:integer;<br>/ex:unit<br>http://vendor.com/tempToDegreesF. |
| 126 | <contentFormat><br>  <measurement><br>    < valueType >xs:integer< valueType /><br><unit>http://vendor.com/tempDegreesC</unit><br>  </measurement><br></contentFormat> | resIdURI /rdf:type ex:contentFormat;<br>    /ex:measurement temperature.<br><br>temperature /rdf:type ex:sample;<br>    /ex:unit<br>http://vendor.com/tempDegreesC;<br>    /ex:hasValueType xs:integer. |
| 127 | <contentFormat><br>  <measurement><br>    < valueType >xs:integer< valueType /><br>    <label>°C<label/><br>  </measurement><br></contentFormat> | resIdURI /rdf:type ex:contentFormat;<br>    /ex:measurement temperature.<br><br>temperature /rdf:type ex:sample;<br>    /ex:label "°C";<br>    /ex:hasValueType xs:integer. |
| 129 | <contentFormat><br>  <delimiter>,<delimiter/><br>  <measurement><br>    < valueType >xs:integer< valueType /><br>    <unit><br>http://vendor.com/tempToDegreesF </unit ><br>  </measurement><br>  <measurement><br>    <value>xs:integer<value/><br>    <unit><br>quantity:AbsoluteHumidity</unit ><br>  </measurement><br>  <measurement><br>    < valueType >xs:integer< valueType /><br>    <unit> http://vendor.com/light </unit ><br>  </measurement><br></contentFormat> | resIdURI /rdf:type ex:contentFormat;<br>    /ex:delimiter ',';<br>    /ex:measurement temperature;<br>    /ex:measurement humidity;<br>    /ex: measurement light.<br><br>temperature /rdf:type ex:sample;<br>    /ex:unit<br>http://vendor.com/tempToDegreesF;<br>    /ex:hasValueType xs:integer.<br>humidity /rdf:type ex:sample;<br>    /ex:unit quantity:AbsoluteHumidity;<br>    /ex:hasValueType xs:integer.<br>light /rdf:type ex:sample;<br>    /ex:unit http://vendor.com/light;<br>    /ex:hasValueType xs:integer. |

An application can use the content descriptions to determine how to process the content of sensor data. The content descriptions would be part of the metadata associated with the content. In systems where the metadata can be accessed separately from the content, there is a significant savings since this "description" can be transmitted a single time and applied to each instance of the actual content. The actual content can be a much smaller payload without sacrificing all of the benefits of having semantic annotations, compared to conventional semantic annotations (such as provided in the background), since the description is created a single time, by the sensor, and retrieved a single time, by each consumer. This process is shown in FIG. 11 for the data coming from source 127 (e.g., a sensor).

Figure 20A:
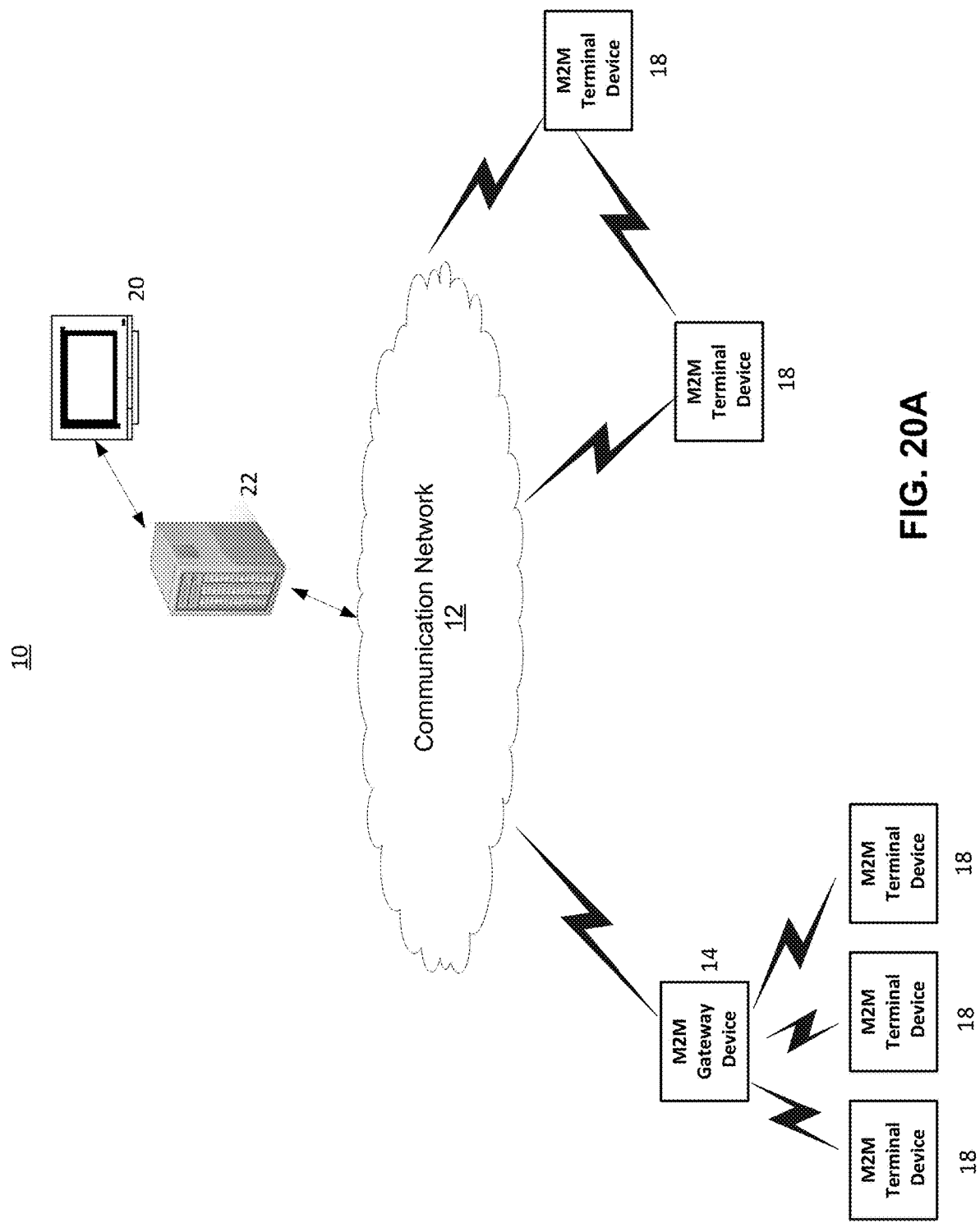
FIG. 20A is a system diagram of an example machine-to-machine (M2M) or Internet of Things (IoT) communication system in which the disclosed subject matter may be implemented.
Figure 20B:
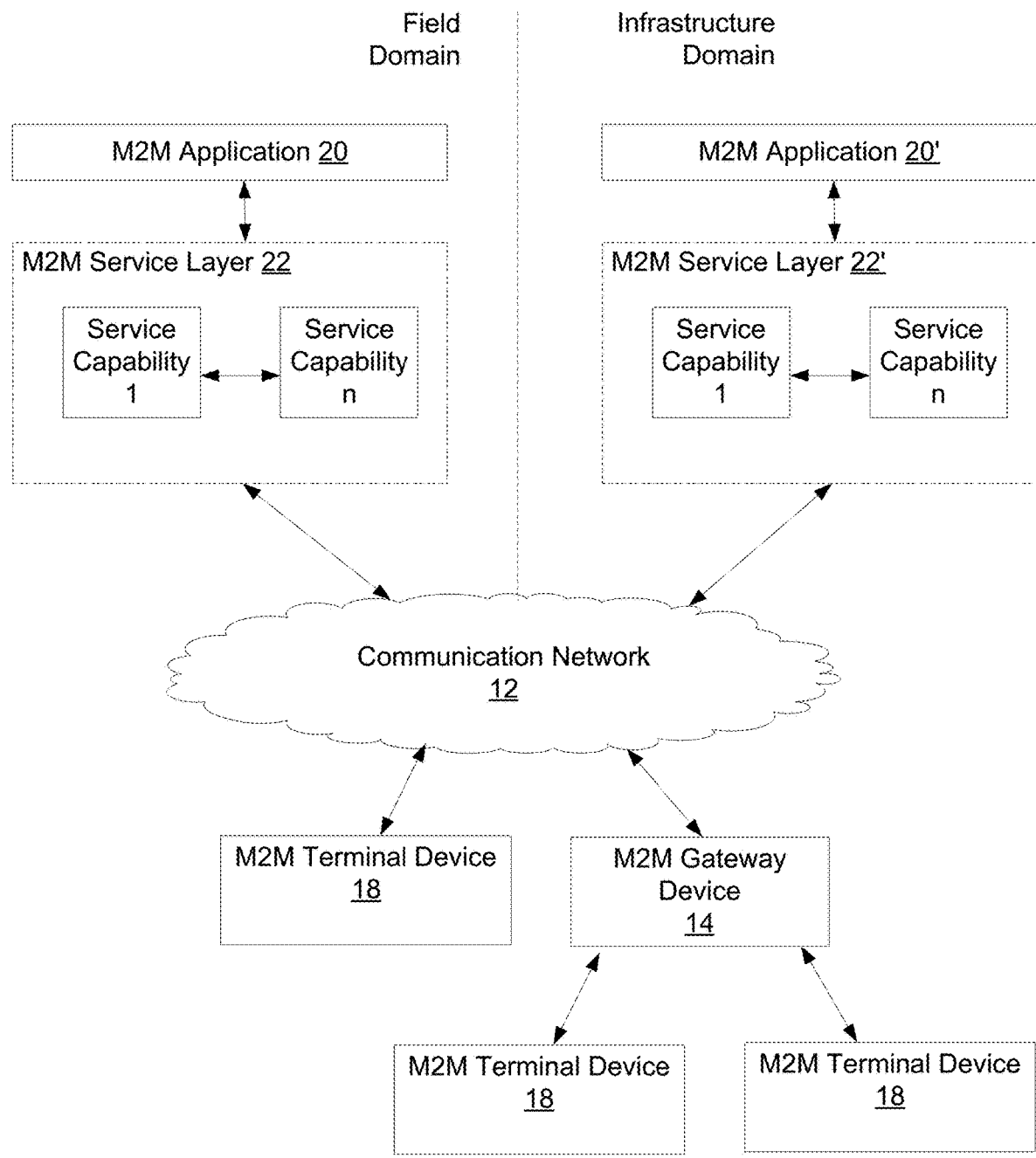
FIG. 20B is a system diagram of an example architecture that may be used within the M2M/IoT communications system illustrated in FIG. 20A.
Figure 20C:
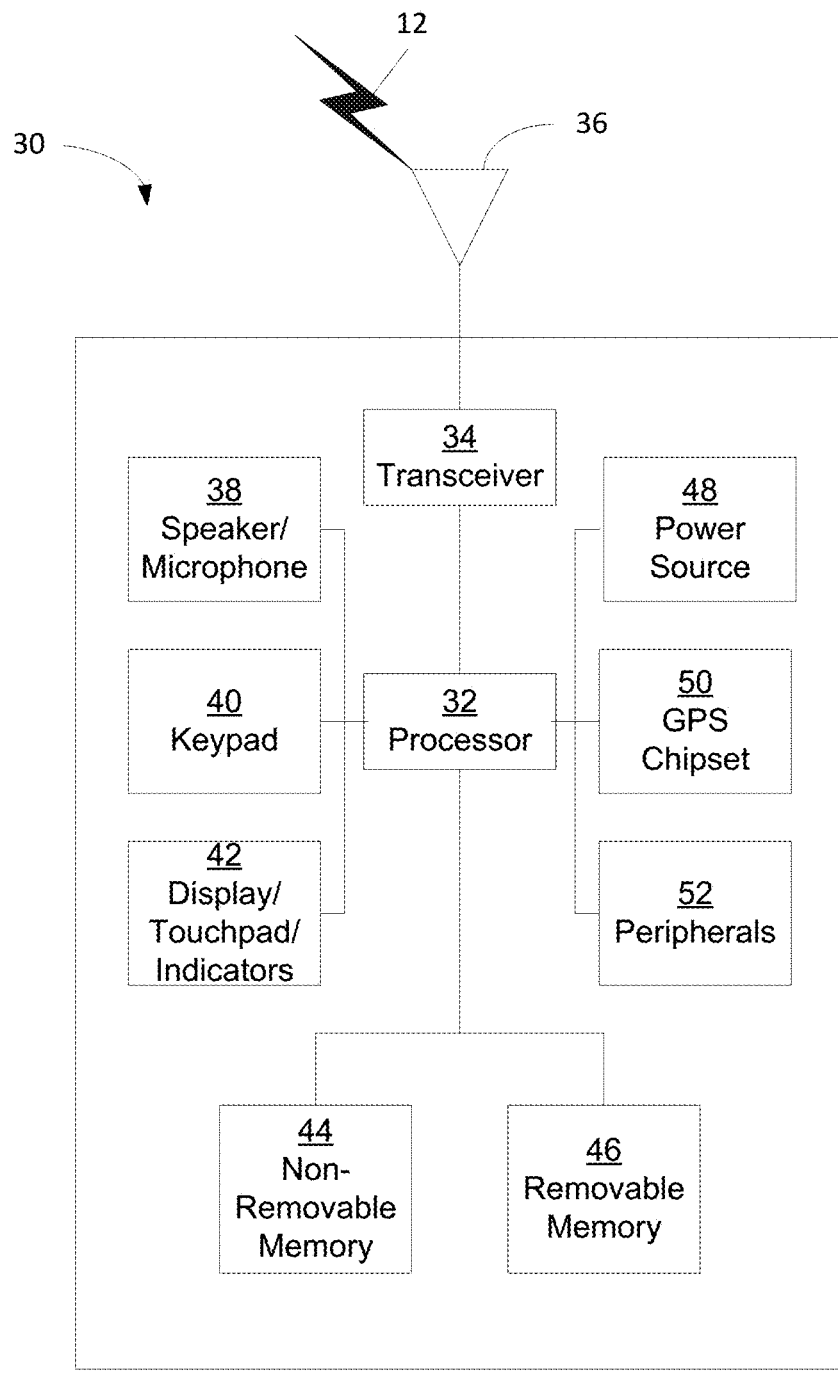
FIG. 20C is a system diagram of an example M2M/IoT terminal or gateway device that may be used within the communications system illustrated in FIG. 20A.
Figure 20D:
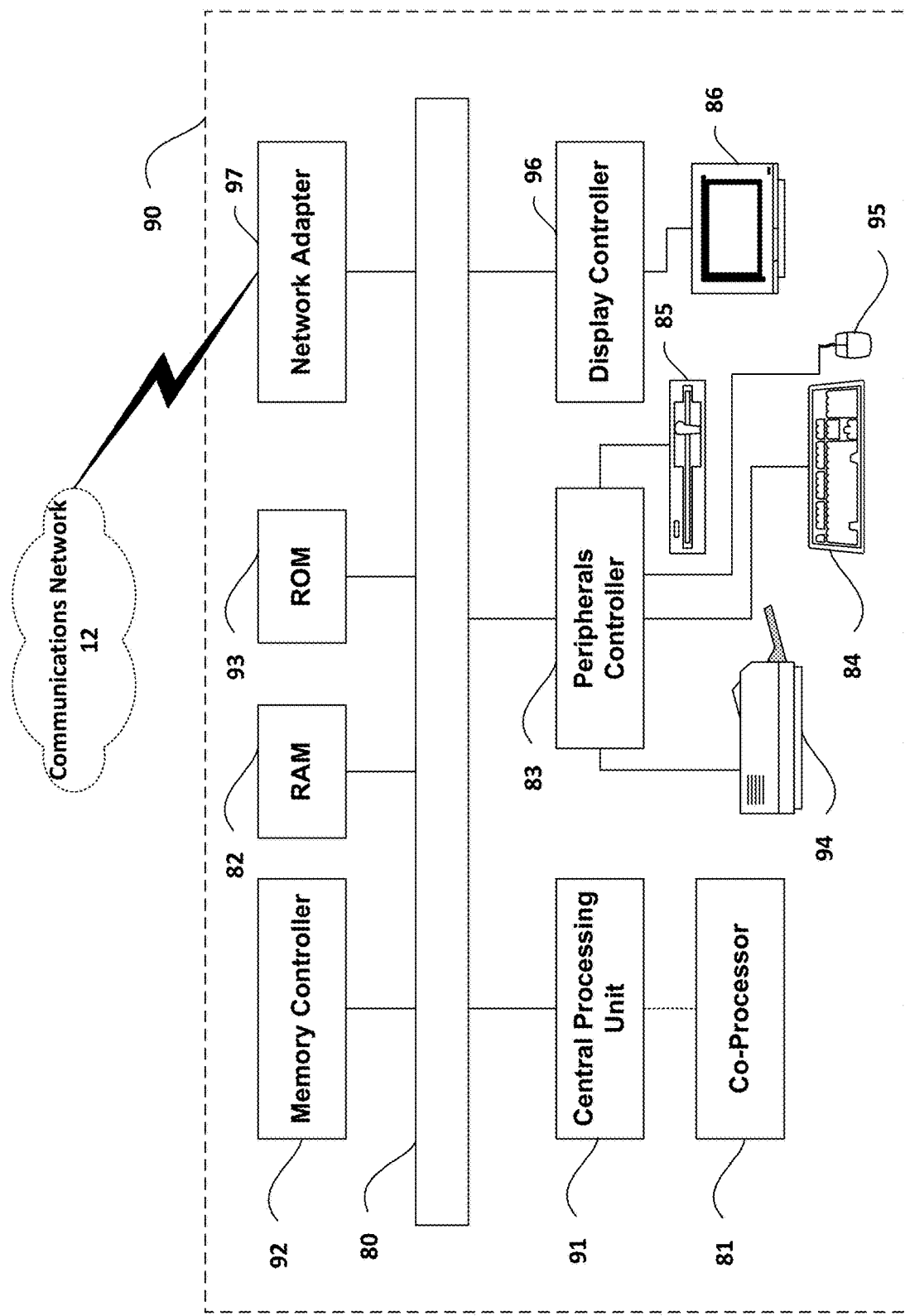
FIG. 20D is a block diagram of an example computing system in which aspects of the communication system of FIG. 20A may be embodied.

It is understood that the entities performing the steps illustrated in FIG. 11-FIG. 14, FIG. 16-FIG. 17, and others are logical entities that may be implemented in the form of software (e.g., computer-executable instructions) stored in a memory of, and executing on a processor of, a device, server, or computer system such as those illustrated in FIG. 20C or FIG. 20D. That is, the method(s) illustrated in FIG. 11-FIG. 14, FIG. 16-FIG. 17, and others may be implemented in the form of software (e.g., computer-executable instructions) stored in a memory of a computing device, such as the device or computer system illustrated in FIG. 20C or FIG. 20D, which computer executable instructions, when executed by a processor of the computing device, perform the steps illustrated in FIG. 11-FIG. 14, FIG. 16-FIG. 17, and others. In an example, with further detail below with regard to the interaction of M2M devices, application 131 of FIG. 11 may reside on M2M terminal device 18 of FIG. 20A, while service layer 132 of FIG. 11 may reside on M2M gateway device 14 of FIG. 20A.

Figure 11:
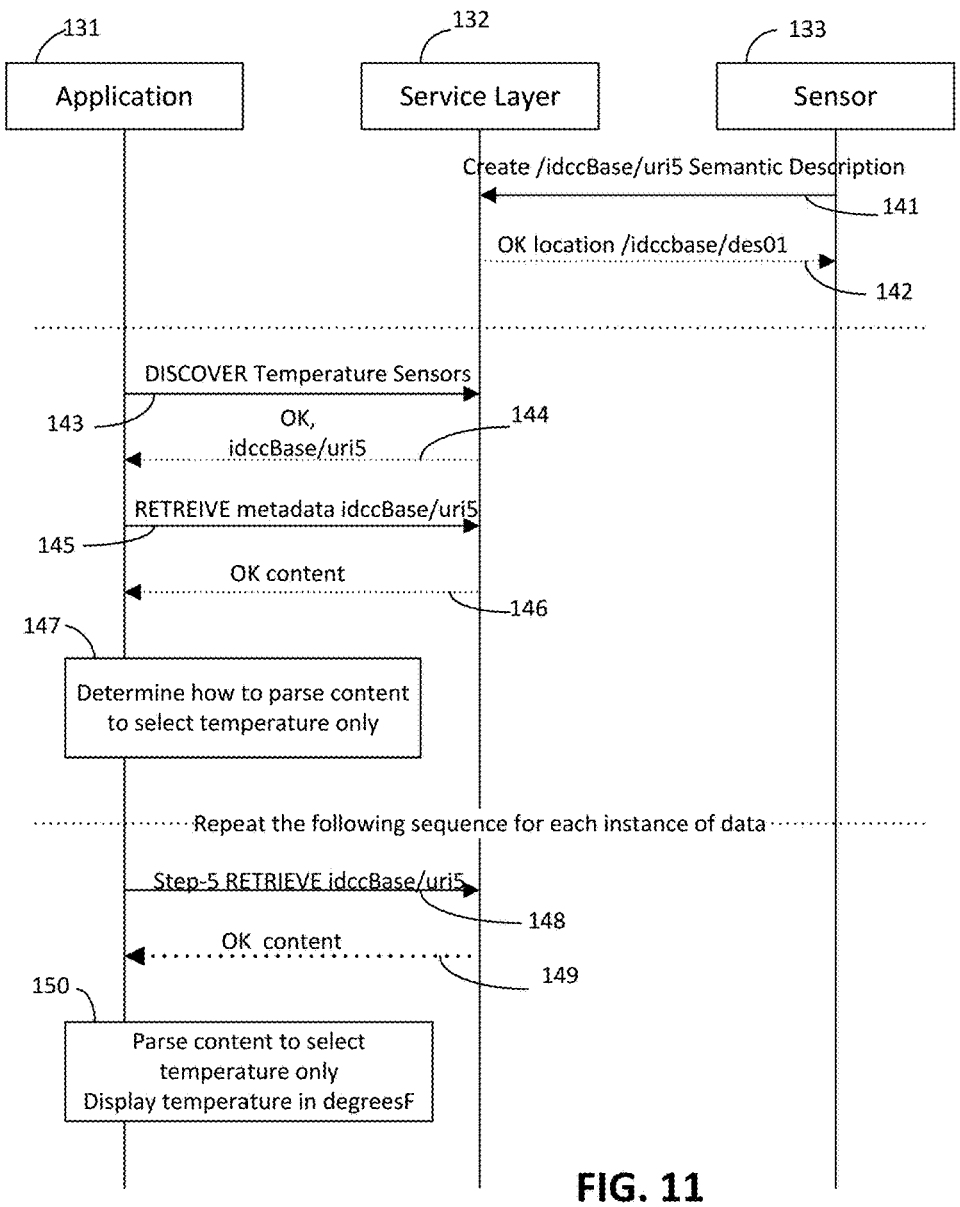
FIG. 11 illustrates an exemplary method to interpret the content of sensor data and convert the data to another format.

FIG. 11 illustrates an exemplary method with semantic description in the service layer. At step 141, sensor 133 (e.g., temperature sensor or some other entity) sends a message that creates (e.g., CREATE) a new semantic description at service layer 132. Table 7 provides exemplary content description of the sensor data. For an example measurement of "22° C.", the description in Table 7 provides that there are two components of this measurement: a value and a label. The value is an integer. The measurement may be parsed using C/C++ language, such as sscanf("22° C.","% d % s", measurement, label). If there was a desire to parse this measurement it may look like the following generalized pseudo code: if <value> equals xs:integer then format="% d % s"; if <value> equals xs:decimal then format="% f % s".

At step 142, service layer 132 sends a response message that may include the location of where the resource created in the previous step, step 141, is stored in service layer 132.

TABLE 7

<contentFormat>
  <measurement>
    <value>xs:integer<value/>
    <label>°C<label/>
  </measurement>
</contentFormat>

With continued reference to FIG. 11, application 131 sends a message to discover/request (e.g., DISCOVER) temperature data from service layer 132. At step 144, service layer 132 sends a response message that may include the resources that match the discovery request, such as a list of temperature containers in this example. At step 145, application 131 (e.g., temperature display application) requests (e.g., RETRIEVES) representation descriptions (e.g., shown in Table 6) for each data element downloaded from service layer 132. At step 146, service layer 132 sends a response message that may include a contentFormat description as shown in table 7. At step 147, application 131 determines how to parse content to select temperature only. Using the contentFormat provided at step 146, application 131 interprets description definitions which specify that the content will have a single measurement with two parts. Part 1 is an integer containing the measurement value. Part 2 is a label containing a literal "° C." Based on the label, application 131 does a lookup or computes a conversion algorithm.

At step 148, application 131 requests (e.g., RETRIEVES) measurement value from service layer 132. At step 149, service layer 132 sends a response message that may include the sensor measurement value, for example "22° C.". At step 150, application 131 converts data. Application 131, parses value from the content "22° C.", value is 22. Application 131 converts value to desired representation using semantic descriptions as described herein with regard to QUDT. The new value is 71.6. Application 131 would translate value 71.6 to desired representation "72° F.". Application 131 would also operate on data and update map to conform to FIG. 7B. Step 148, step 149, and step 150 may be repeated for each temperature measurement from sensor 133. Steps 145 thru step 150 may be repeated for each new sensor discovered in step 143 and step 144.

Content Conversion

Using the method described in FIG. 11, an application or device can interpret the content of sensor data and convert the data to another format. Application 131 may get data from potentially any sensor. However there is a fair amount of computational complexity for application 131 in order for it to use that information, as shown with regard to FIG. 11. For example, application 131 would need to convert the data to a representation that it can process. To reduce the complexity required for application 131 to use data from multiple sources, described herein are methods for application 131 to specify to service layer 132 (e.g., M2M service layer) the desired representation of the data retrieved. In addition, disclosed herein are methods for service layer 132 to perform steps to translate data to the specified representation and return the result to application 131.

An application that knows the representation of data that it processes can build a "content description," as shown with regard to FIG. 11. Application 131 may then provide that "content description" to service layer 132, such that the service layer 132 stores it or has access to it. Alternatively, an application can use a predefined "content description" located by discovery or other means. For this disclosure it is assumed that storage and discovery capabilities are present.

Figure 12:
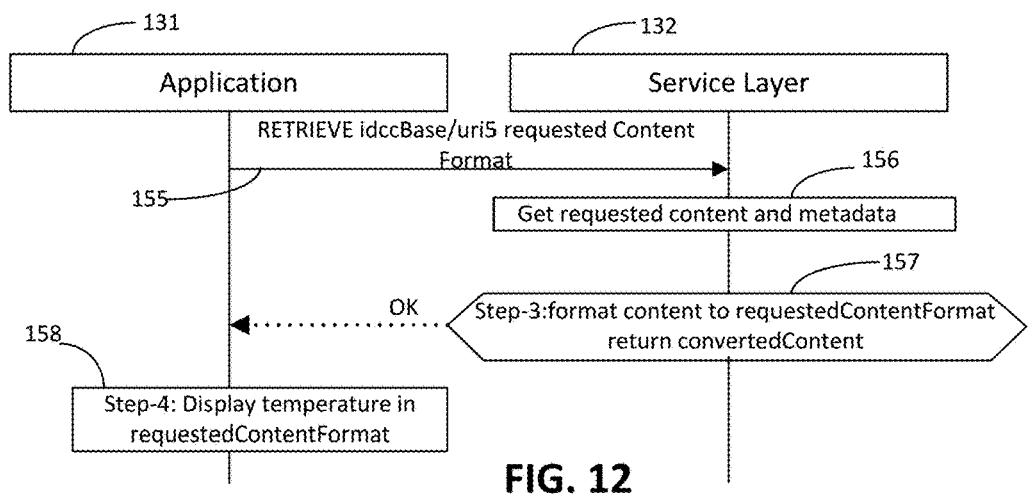
FIG. 12 illustrates an exemplary method for service layer data formatting.

When application 131 retrieves content from service layer 132, application 131 provides the "content description" or an address to where the "content description" is located. Service layer 132 then retrieves the requested "content" and converts it to the "content description" provided. This is shown in FIG. 12, which illustrates an exemplary method for service layer data formatting. At step 155, application 131 sends a request message (e.g., RETRIEVE Request) for temperature data and the desired representation of the response in the requestedContentFormat. The requestedContentFormat can be included in the request or as a link as shown in Table 8.

TABLE 8

| Embedded in the Request | Address to requestedContentFormat |
|---|---|
| <contentFormat><br>  <measurement><br>    <label>°F<label/><br>    <value>xs:integer<value/><br>  </measurement><br></contentFormat> | URI of requestedContentFormat |

With continued reference to FIG. 12, at step 156, service layer 132 receives the content and the meta-data containing the format description of the stored content, which may be from a data repository. Service layer 132 may parse content format description (e.g., parse content to select temperature only). Application 131 interprets description definitions. Content, for example, has a single measurement with two parts. Part 1 is an integer containing the measurement value. Part 2 is a label containing a literal "° C." Based on the label, application 131 does a lookup or computes a conversion algorithm. At step 157, service layer 132 sends converted data in response. The data may be converted at service layer considering the following example. Service layer 132 parses a value from the content "22° C.," where value is 22. Service layer 132 converts value to desired format using semantic descriptions as described with regard to QUDT herein. The new value is 71.6. Service layer 132 translates desired representation of "72° F." as shown in FIG. 7B. Then service layer 132 sends requested measurement with converted value to the requesting application. At step 158, application 131 operates on data, e.g., update application map of FIG. 7B as illustrated herein.

Using this method with regard to FIG. 12, service layer 132 can offload some of the computational complexity from the applications that use data from many sensors since the data provided to the consumer is in the representation desired. Note that the data formatting service may advertise what formats it understands. The data formatting service may also provide an API, Console, or GUI that allows the service to receive rules for converting between data formats. The data formatting service is a service that converts data that exists in a contentFormatA to a different contentFormatB. An example rule would be one similar to what is shown with regard to QUDT above. The data formatting service is a service that converts data that exists in a contentFormatA to a different contentFormatB.

Content Restructuring

As shown in FIG. 7A and FIG. 9, a device may provide measurement values from multiple sensors in a single content (e.g., source 129). However application 131, which receives the data, may be just interested in the temperature portion of the measurement. Using the methods described herein, service layer 132 may convert the data to a different representation and then send the multiple converted content to application 131. In an example, application 131 parses the received multiple converted content to display only the desired measurement, ignoring the other data present. In light of the aforementioned example, there may be additional methods to reduce the complexity required for application 131 and more efficiently use bandwidth by eliminating the transmission of some data. Disclosed herein are methods for a service layer to perform steps to restructure, add, or remove data to match a specified representation and return the result to an application. An example with regard to adding data may include if time and location data is desired in the content, yet the measurement does not include that in the content because it is part of the metadata. For example: Resource123 {measuredOn 1 Jan. 2015; measuredAt King Of Prussia; content "22° C."; other metadata about Resource123}. The requestor does not want all of the metadata about Resource123, just those shown above. The content attribute is modified so that all of the desired information is in the content. This allows the requestor to retrieve only the single attribute: Resource123.content and get the response {72° F., King Of Prussia, 1 Jan. 2015}. This reduces the amount of data transmitted to only the desired data and converts it to the desired format. For additional context, it should be understood that semantic description is meta-data. Meta-data contains information about the data. For example, the data is "22° C.". The meta-data is measuredOn, measuredAt, semantic description.

Figure 13:
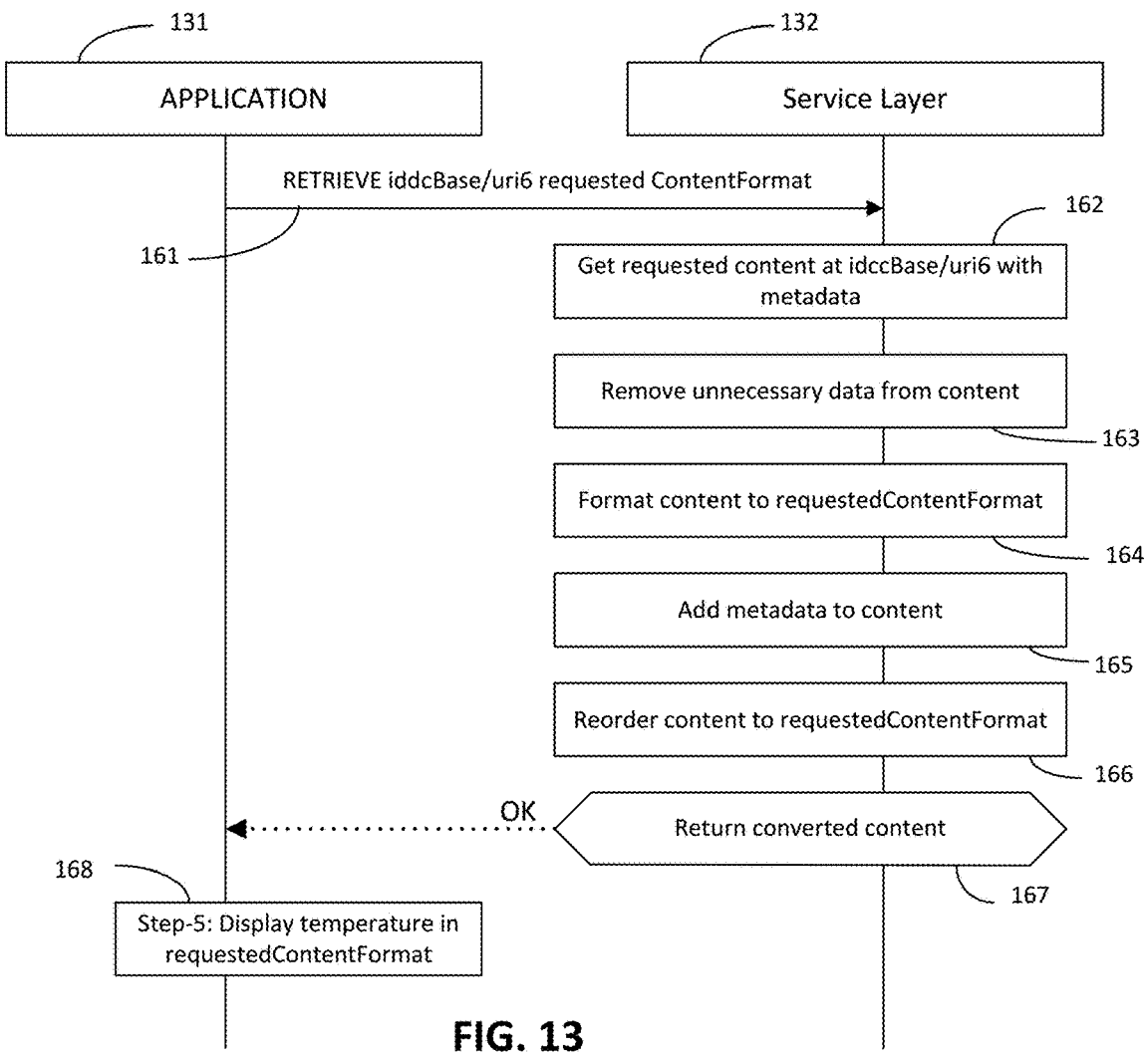
FIG. 13 illustrates an exemplary method for the service layer to remove, add, or reorder requested content.

FIG. 13 illustrates an exemplary method for the service layer to remove, add, or reorder requested content. At step 161, application 131 sends a request message (e.g., RETRIEVE request) for temperature data and the desired representation of the response in the requestedContentFormat. The requestedContentFormat may be included in the request or as a link as shown in Table 9.

in this use-case). With regard to the third measurement (measurement 3), part 1 is an integer containing the measurement value (e.g., 212) and part 2 is a URI which describes a "light" measurement and the units of measurement (it could be 'ohms' from a photodetector in this use-case). A lookup or computed conversion algorithm or query may be based on the 'label' and 'unit.'

With continued reference to FIG. 13, regarding steps 163 through steps 166, there is a comparison of "requestedContentFormat" with stored "contentFormat" to identify elements that require re-formatting. In this example, the first element (measurement 1) of the content is the only one that is desired in the response. Additional data is requested and provided from meta-data associated with the content. At step 163, service layer 132 may parse value from the content "352, 100, 212". The first integer is a temperature measurement (measurement 1) with a value of 352. The remaining data (measurement 2 and measurement 3), which is not temperature, is truncated by service layer 132. At step 164, the value of step 163 is converted into desired format, which is 72 (see FIG. 7B) and translated to desired representation, which is "72° F." At step 165, meta-data is added to content. Additional data, which may have been in the message of step 161, is identified (e.g., timestamp and location). Data may be extracted from resource meta-data, such as creation time for when the data was stored is used for Timestamp and location meta-data used for "lat" and "lon" values. In the current context a resource is the combined set of data and the meta-data. At step 166, content may be reordered to look like the following: 72° F., 5 Jun. 2015 12:48:31.23,40.1,−75.4. The content may be reordered based on requestedContent-

TABLE 9

| Embedded in the request | Address to requestedContentFormat |
|---|---|
| <contentFormat><br>   <measurement><br>      <label>°F<label/><br>      <value>xs:integer<value/><br>   </measurement><br>   <measurement><br>      <value>xs:dateTime<value/><br>      <unit>ns:timestamp</unit><br>   </measurement><br>   <measurement><br>      <unit>ns:lat< unit /><br>      <value>xs:integer<value/><br>   </measurement><br>   <measurement><br>      <unit>ns:lon<unit/><br>      <value>xs:integer<value/><br>   </measurement><br></contentFormat> | URI of requestedContentFormat |

At step 162, service layer 132 receives the content of step 161 and the meta-data containing the format description of the stored content from a data repository. Content format description (see source 129 of Table 6, FIG. 7B, and FIG. 9) is parsed. Content of exemplary source 129 has three measurements with two parts each. With regard to the first measurement (measurement 1), part 1 is an integer containing the measurement value (e.g., 352) and part 2 is a URI which describes a "temperature" measurement and the units of the measurement (it could be 'ohms' from thermistor in this use-case). With regard to the second measurement (measurement 2), part 1 is an integer containing the measurement value (e.g., 100) and part 2 is a URI which describes a "(relative) humidity" measurement and the units of measurement (it could be 'volts' from a humidity sensor Format. At step 167, a message is sent with the requested measurement (e.g., converted value) based on the message of step 161. At step 168, application 131 operates on data (e.g., update application map of FIG. 7A to what is shown in FIG. 7B.)

Using the method associated with FIG. 13, service layer 132 can restructure the content to reduce the processing complexity of the consumer and provide only the requested information. Service layer 132 provides data in the representation desired by application 131.

oneM2M RoA Embodiment

Figure 14:
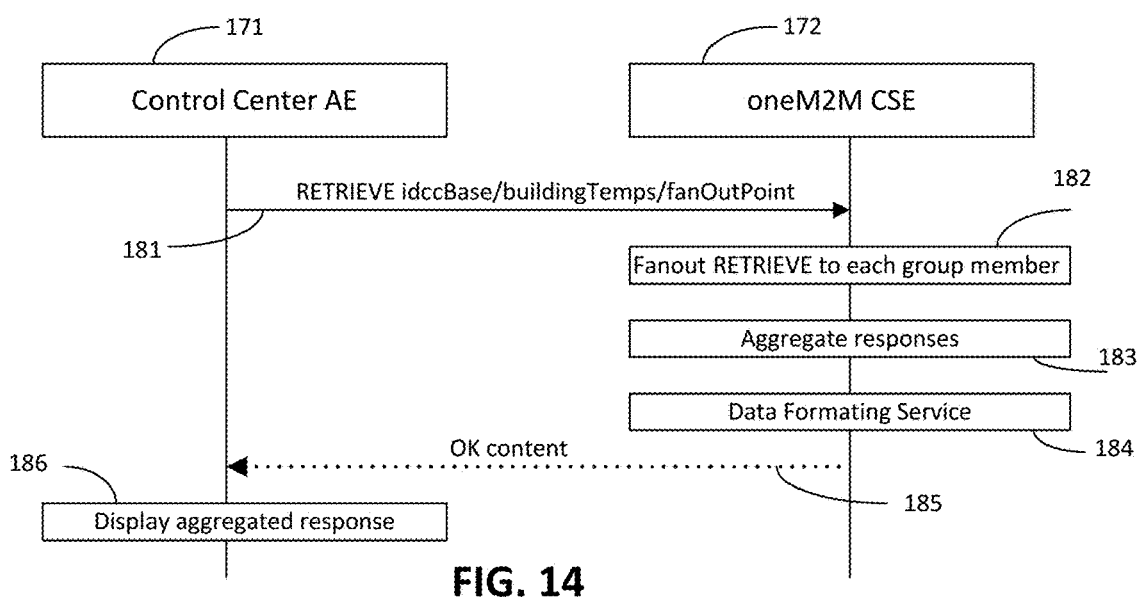
FIG. 14 illustrates an exemplary call flow for a control center application.

Below are exemplary methods for implementing semantics based content specification in the oneM2M Architecture (e.g., oneM2M RoA). The example is illustrated in the context of a smart building example scenario where many sensors and controllers are deployed. FIG. 14 illustrates an exemplary control center application steady state call flow. Control center application entity 171 (e.g., application 131) is developed with the initial Smart Building deployment. A <group> resource named <buildingTemps> is created to get the status of all temperature sensors with a single retrieve request. At step 181, control center AE 171 sends a request message to oneM2M CSE 172 with <buildingTemps>. At step 182, oneM2M CSE 172 send messages to appropriate members of the group associated with <buildingTemps>. At step 183, oneM2M CSE 172 aggregates any received responses associated with the request of step 182. At step 184, oneM2M CSE 172 uses a data formatting service associated with one of the multiple examples discussed herein (e.g., FIG. 12 or FIG. 13). At step 185, the properly converted data is sent by oneM2M CSE 172. At step 186, control center AE 171 appropriately displays aggregated responses based on the received content of step 185.

To provide additional perspective, during initial deployment ensuring that all temperature Sensors return data using the same format is easy because they can be provided by a single vendor. In the sample response shown in Table 10, the responses from the temperature sensors are all in ° F. Table 10 provides an example aggregated response from group fanoutPoint RETRIEVE request in an initial deployment. The sample responses from the oneM2M service layer are using XML for the payloads. In oneM2M, the information contained in the response primitive uses shortnames. See oneM2M Service Layer Core Protocol Specification, oneM2M-TS-0004 oneM2M Service Layer Core Protocol Specification-V-1.1.0. <pc> indicates Content which can be any <resource>; <cin> indicates contentInstance; <con> indicates content of a contentInstance. Some attributes are not shown for the sake of clarity in this example.

TABLE 10

<m2m:responsePrimitive>
    <rsc>2000</rsc>
    <rqi> reqId123</rqi>
    <pc>
        <cin rn="temp1">
            <con>72</con>
        </cin>
    </pc>
    <pc>
        <cin rn=" temp2">
            <con>68</con>
        </cin>
    </pc>
    <pc>
        <cin rn=" temp3">
            <con>74</con>
        </cin>
    </pc>
    <pc>
        <cin rn=" temp4">
            <con>75</con>
        </cin>
    </pc>
    <pc>
        <cin rn=" temp5">
            <con>70</con>
        </cin>
    </pc>
</m2m:responsePrimitive>

Subsequent to the initial deployment more temperature sensors may be installed and some existing temperature sensors are replaced with new temperature sensors from different manufacturers. The new temperature sensors are added to the <buildingTemps> group, which can generate this response to the call flow shown in FIG. 14. Table 11 shows an example of an upgraded deployment aggregated response from a group fanoutPoint RETRIEVE request (e.g., step 182). The response in Table 11 shows that "temp3" was replaced and a new "temp6" was added, where these temperature sensors indicate status using ° C. instead of ° F.

TABLE 11

<m2m:responsePrimitive>
    <rsc>2000</rsc>
    <rqi> reqId123</rqi>
    <pc>
        <cin rn="temp1">
            <con>72</con>
        </cin>
    </pc>
    <pc>
        <cin rn=" temp2">
            <con>68</con>
        </cin>
    </pc>
    <pc>
        <cin rn=" temp3">
    <con>26°C</con>
        </cin>
    </pc>
    <pc>
        <cin rn=" temp4">
            <con>75</con>
        </cin>
    </pc>
    <pc>
        <cin rn=" temp5">
            <con>70</con>
        </cin>
    </pc>
    <pc>
        <cin rn="temp6">
    <con>21°C</con>
        </cin>
    </pc>
</m2m:responsePrimitive>

If the control application determines HVAC status based on an average of all of the temperature sensor values in the group, then the new sensors would indicate a colder ambient temperature and erroneously turn heating systems ON. This would require maintenance and updates to the control application, increasing the system cost of ownership. However, by applying the procedures described herein (e.g., FIG. 11 through FIG. 13), the control application can be created in a manner that increases compatibility and makes it safe against the types of changes described.

The different actors that would play a part in the aforementioned example may include oneM2M temperature sensor Fahrenheit (e.g., M2M terminal device 18 or sensor 133), oneM2M temperature sensor Celsius (e.g., M2M terminal device 18 or sensor 133), oneM2M control application (e.g., control center AE 171 or M2M application 20), and oneM2M service layer (e.g., oneM2M CSE 172 or M2M service layer 22). Exemplary oneM2M Temperature Sensor Fahrenheit is a sensor device that registers to a Service Layer and creates a container for the measured temperature values. The semantic description for content from oneM2M temperature sensor Fahrenheit is shown in Table 12.

TABLE 12 resIdURI /rdf:type ex:contentFormat;
    /ex:measurement temperature.
temperature /rdf:type ex:sample;

TABLE 12-continued

/ex:unit unit:DegreeFahrenheit;
/ex:hasValueType xs:integer.

Exemplary oneM2M Temperature Sensor Celsius is a sensor device that registers to a Service Layer and creates a container for the measured temperature values. The ontology definition for content from oneM2M Temperature Sensor Celsius is shown in Table 13.

TABLE 13 resIdURI /rdf:type ex:contentFormat;
/ex:measurement temperature.
temperature /rdf:type ex:sample;
/ex:unit unit:DegreeCelsius;
/ex:hasValueType xs:integer;
/ex:label "°C".

Exemplary oneM2M Control Application monitors sensors in the smart build and controls "Smart" components, such as the HVAC system. This control application has permissions to access the requested resources and operations.

oneM2M Service Layer supports the "Content Conversion" methods described herein. This functionality could be added in the existing Data Management & Repository (DMR) CSF. Alternatively a new CSF is proposed to manage the conversion of data. For purposes of this embodiment the new functionality is assumed to be part of the "Data Formatting" CSF 188 (DF CSF). DF CSF 188 is a service layer function that processes responses to make sure data in response matches semantic representation requested. The following new primitive request parameters are defined: semAccept and semSuggest. With reference to semAccept, content is returned in the specified semantic representation only. If semantic conversion is not possible, then an error is returned. This parameter is valid for <contentInstance> resources. This parameter is supported in operations that return <contentInstance> resources, such as RETRIEVE, NOTIFICATIONS, or Long Polling. With reference to semSuggest, content is returned in the specified semantic representation if semantic conversion is possible, otherwise the original content is returned. This parameter is valid for <contentInstance> resources. This parameter is supported in operations that return <contentInstance> resources, such as RETRIEVE, NOTIFICATIONS, or Long Polling.

Figure 16:
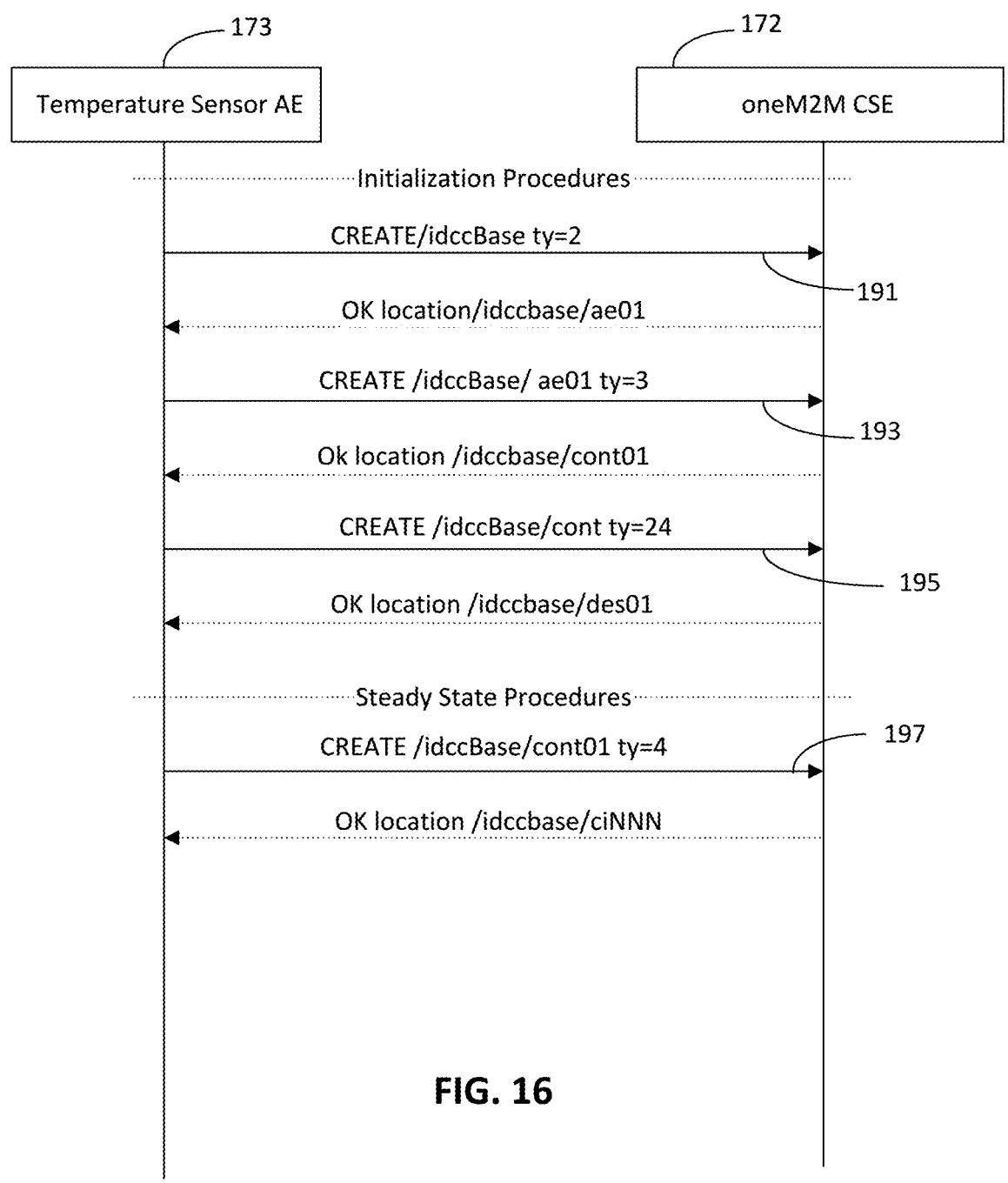
FIG. 16 illustrates an exemplary sensor call flow.
Figure 17:
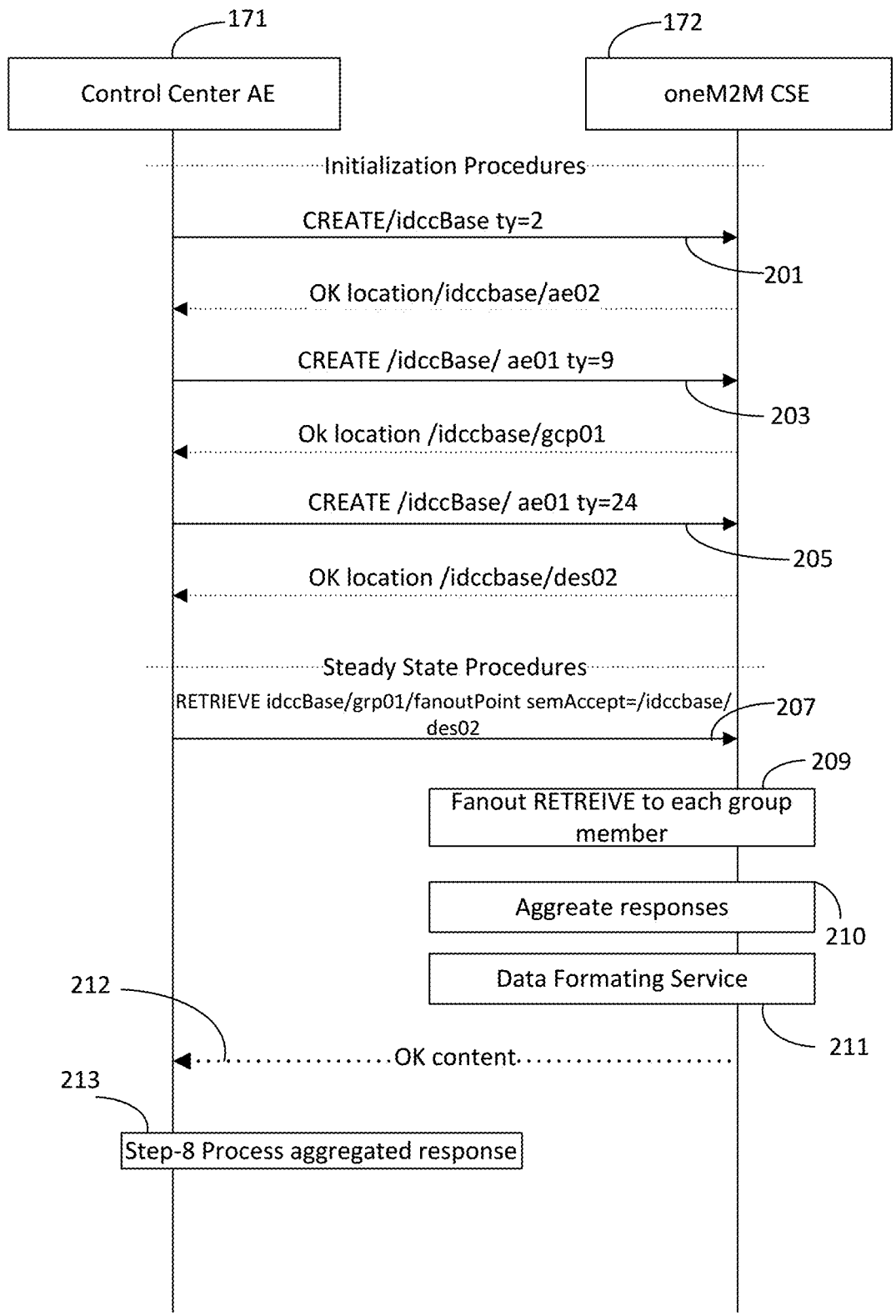
FIG. 17 illustrates an exemplary Control Center AE Call Flows.

Discussed below is an example sensor call flow. FIG. 16 illustrates an exemplary sensor call flow. In the example, there are two different types of temperature sensors described that have the same operations and call flows, but use different semantic representations for the contentInstances created containing the temperature measurements. At step 191, temperature sensor AE 173 sends a request message (e.g., Create <AE>) to register to the buildings oneM2M service layer 172. See table 14.

TABLE 14

| <AE> Registration Primitives | |
|---|---|
| Request (Temperature Sensor -> Service Layer) | Sent CREATE request contains<br>To: <CSEBase><br>ResourceType=AE<br>Fr: AE-ID<br>Cn: <AE> to be created |
| Response (Service Layer -> Temperature Sensor) | Sent CREATE response contains<br>To: AE-ID<br>Fr: CSE-ID<br>Response Status Code : OK |

At step 193 (see table 15), oneM2M CSE 172 receives a message with regard to Create <container> for storage of the temperature measurements from temperature sensor AE 173. oneM2M CSE 172 executes on the request of the message at step 193. At step 195 (see table 16), oneM2M CSE 172 receives a request message (e.g., Create <semanticDescriptor>) for describing the format of the data in the <contentInstance> resources created. oneM2M CSE 172 executes on the request of message at step 195.

TABLE 15

| <container> CREATE Primitives | |
|---|---|
| Request (Temperature Sensor -> Service Layer) | Sent CREATE request contains<br>To: <CSEBase>/<AE><br>ResourceType= container<br>Fr: AE-ID<br>Cn: < container > to be created |
| Response (Service Layer -> Temperature Sensor) | Sent CREATE response contains<br>To: AE-ID<br>Fr: CSE-ID<br>Response Status Code : OK |

TABLE 16

| <semanticDescriptor> CREATE Primitives | |
|---|---|
| Request (Temperature Sensor -> Service Layer) | Sent CREATE request contains<br>To: <CSEBase>/< container ><br>ResourceType= semanticDescriptor<br>Fr: AE-ID<br>Cn: < semanticDescriptor > to be created<br><pc><br>< semanticDescriptor><br><descriptor>See Table 17</descriptor ><br></ semanticDescriptor ><br></pc> |
| Response (Service Layer -> Temperature Sensor) | Sent CREATE response contains<br>To: AE-ID<br>Fr: CSE-ID<br>Response Status Code : OK |

The procedure described with regard to FIG. 11 is captured as detailed payload for the existing <semanticDescriptor> resource defined in oneM2M Functional Architecture, oneM2M-TS-0001 oneM2M Functional Architecture-V-2.1.0. Note in FIG. 16, ResourceType (ty) is listed as 24 in step 195. This may not be the actual value used in oneM2M Service Layer Core Protocol Specification, oneM2M-TS-0004 oneM2M Service Layer Core Protocol Specification-V-1.1.0, as this resource type has not been documented at the time of writing this application.

Table 17 shows the <contentFormat> for both types of sensors. Sensors that report "Fahrenheit" use row 1 and the sensors that report "Celsius" use row 2. In the first column, the unencoded <contentFormat> definition is shown.

TABLE 17

| <semanticDescriptor>/descriptor attribute | |
|---|---|
| Fahrenheit | resIdURI /rdf:type ex:contentFormat; /ex:measurement temperature. temperature /rdf:type ex:sample; /ex:unit unit:DegreeFahrenheit; /ex:hasValueType xs:integer. |
| Celsius | resIdURI /rdf:type ex:contentFormat; /ex:measurement temperature. temperature /rdf:type ex:sample; /ex:unit unit:DegreeCelsius; /ex:hasValueType xs:integer; /ex:label "°C". |

At step 197 (see Table 18), oneM2M CSE 172 receives a message to Create <contentInstance> containing the temperature measurements from temperature sensor AE 173. oneM2M CSE 172 executes on the request from the message of step 197. The <con> attribute of the <contentInstance> resource will vary with the measurement taken. Table 19 lists sample measurements from sensors.

TABLE 18

| <contentInstance> CREATE Primitives | |
|---|---|
| Request (Temperature Sensor -> Service Layer) | Sent CREATE request contains To: <CSEBase>/<container> ResourceType= contentInstance Fr: AE-ID Cn: < contentInstance > to be created <pc> < cin > <con>See below</con > </cin > </pc> |
| Response (Service Layer -> Temperature Sensor) | Sent CREATE response contains To: AE-ID Fr: CSE-ID Response Statuse Code : OK Cn: Created <contentInstance> |

TABLE 19

| Sensor Id | Content |
|---|---|
| temp1 | 72 |
| temp2 | 68 |
| temp3 | 26° C. |
| temp4 | 75 |
| temp5 | 70 |
| temp6 | 21° C. | oneM2M Control Application Call Flows

Discussed below is oneM2M control application call flows. During initial development it could be useful to understand the format of the data provided by sensors (recall that during initial deployment all of the sensors use the same format). The example of procedures described with regard to FIG. 11 is realized when a developer gets this information by retrieving the <semanticDescriptor> resource of the <container>. The response provides the information captured in Table 17 for Fahrenheit measurements. During normal operation control center application implements the call flow described in FIG. 17.

At step 201 (see also Table 20), oneM2M CSE 172 receives a request message (e.g., Create <AE>) to register to the buildings oneM2M Service Layer. oneM2M CSE 172 executes request based on step 201 and registers control center AE 171.

TABLE 20

| Control Center <AE> CREATE primitives | |
|---|---|
| Request (Control Center -> Service Layer) | Sent CREATE request contains To: <CSEBase> ResourceType=AE Fr: AE-ID Cn: <AE> to be created |
| Response (Service Layer -> Control Center) | Sent CREATE response contains To: AE-ID Fr: CSE-ID Response Status Code : OK |

At step 203 (see also Table 21), oneM2M CSE 172 receives a request message (e.g., Create <group>) for optimized retrieval of sensor data. oneM2M CSE 172 executes request based on step 203 and creates group for retrieval of sensor data.

TABLE 21

| <group> CREATE primitives | |
|---|---|
| Request (Control Center -> Service Layer) | Sent CREATE request contains To: <CSEBase>/<AE> ResourceType= group Fr: AE-ID Cn: <group> to be created |
| Response (Service Layer -> Control Center) | Sent CREATE response contains To: AE-ID Fr: CSE-ID Response Status Code : OK |

At step 205 (see also Table 22), oneM2M CSE 172 receives a request message (e.g., Create <semanticDescriptor>) for describing the format of the data desired. While there are two different content format descriptions used by the sensors, only one will be used for responses, shown in Table 23.

TABLE 22

| <semanticDescriptor> CREATE primitives | |
|---|---|
| Request (Control Center -> Service Layer) | Sent CREATE request contains<br>　　To: <CSEBase>/< AE ><br>　　ResourceType= semanticDescriptor<br>　　Fr: AE-ID<br>　　Cn: < semanticDescriptor > to be created<br>　　<pc><br>　　　　< semanticDescriptor><br>　　　　　<descriptor>See below</descriptor ><br>　　　　</ semanticDescriptor ><br>　　</pc> |
| Response (Service Layer -> Control Center) | Sent CREATE response contains<br>　　To: AE-ID<br>　　Fr: CSE-ID<br>　　Response Status Code : OK |

TABLE 23

| <semanticDescriptor> plain text and encoded |
|---|
| resIdURI /rdf:type ex:contentFormat;<br>　　/ex:measurement temperature.<br>temperature /rdf:type ex:sample;<br>　　/ex:unit unit:DegreeFahrenheit;<br>　　/ex:hasValueType xs:integer. |

At step 207 (see also Table 24), oneM2M CSE 172 receives a request message (e.g., Retrieve <group>) to get temperature sensor data. oneM2M CSE 172 executes request of step 207. The example associated with FIG. 12 is achieved by defining a new request primitive attribute "semAccept". This would indicate a contentFormat description, typically by specifying a URI to a <semanticDescriptor> resource, or if the contentFormat description is simple enough it may be included directly (not shown). The response shown in Table 24 shows all temperature values is degrees Fahrenheit even though two sources, source/temp 3 and source/temp 6 of Table 19, reported temperature values in degrees Celsius and included a label "° C." with the value.

TABLE 24

| <group>/fanoutPoint RETRIEVE primitives | |
|---|---|
| Request (Control Center -> Service Layer) | Sent RETRIEVE request contains<br>　　To: <CSEBase>/<group>/fanoutPoint<br>　　Fr: AE-ID<br>　　semAccept:<br>　　<CSEBase>/<semanticDescriptor> |
| Response (Service Layer -> Control Center) | Sent RETRIEVE response contains<br>　　To: AE-ID<br>　　Fr: CSE-ID<br>　　Response Status Code : OK<br>　　Cn: < primtive > to be retrieved<br>　　<m2m: responsePrimitive><br>　　　　<rsc>2000</rsc><br>　　　　<rqi> reqId123</rqi><br>　　　　<pc><br>　　　　　　<cin rn="temp1"><br>　　　　　　　　<con>72</con><br>　　　　　　</cin><br>　　　　</pc><br>　　　　<pc><br>　　　　　　<cin rn=" temp2"><br>　　　　　　　　<con>68</con><br>　　　　　　</cin><br>　　　　</pc><br>　　　　<pc><br>　　　　　　<cin rn=" temp3"><br>　　　　　　　　<con>74</con><br>　　　　　　</cin><br>　　　　</pc><br>　　　　<pc><br>　　　　　　<cin rn=" temp4"><br>　　　　　　　　<con>75</con><br>　　　　　　</cin><br>　　　　</pc><br>　　　　<pc> |

TABLE 24-continued

<group>/fanoutPoint RETRIEVE primitives

```
            <cin rn=" temp5">
                <con>70</con>
            </cin>
        </pc>
        <pc>
            <cin rn"temp6">
                <con>70</con>
            </cin>
        </pc>
    </m2m:responsePrimitive>
</pc>
```

Step 209 and step 210 may use currently defined oneM2M <group>/fanoutPoint operations. Step 211 shows the oneM2M example of the Service Layer methods described herein (e.g., associated with FIG. 11 through FIG. 13). They are further detailed below. At step 213, control center AE processes the received aggregated responses which may be received at step 212.

oneM2M Service Layer Operations

Figure 15:
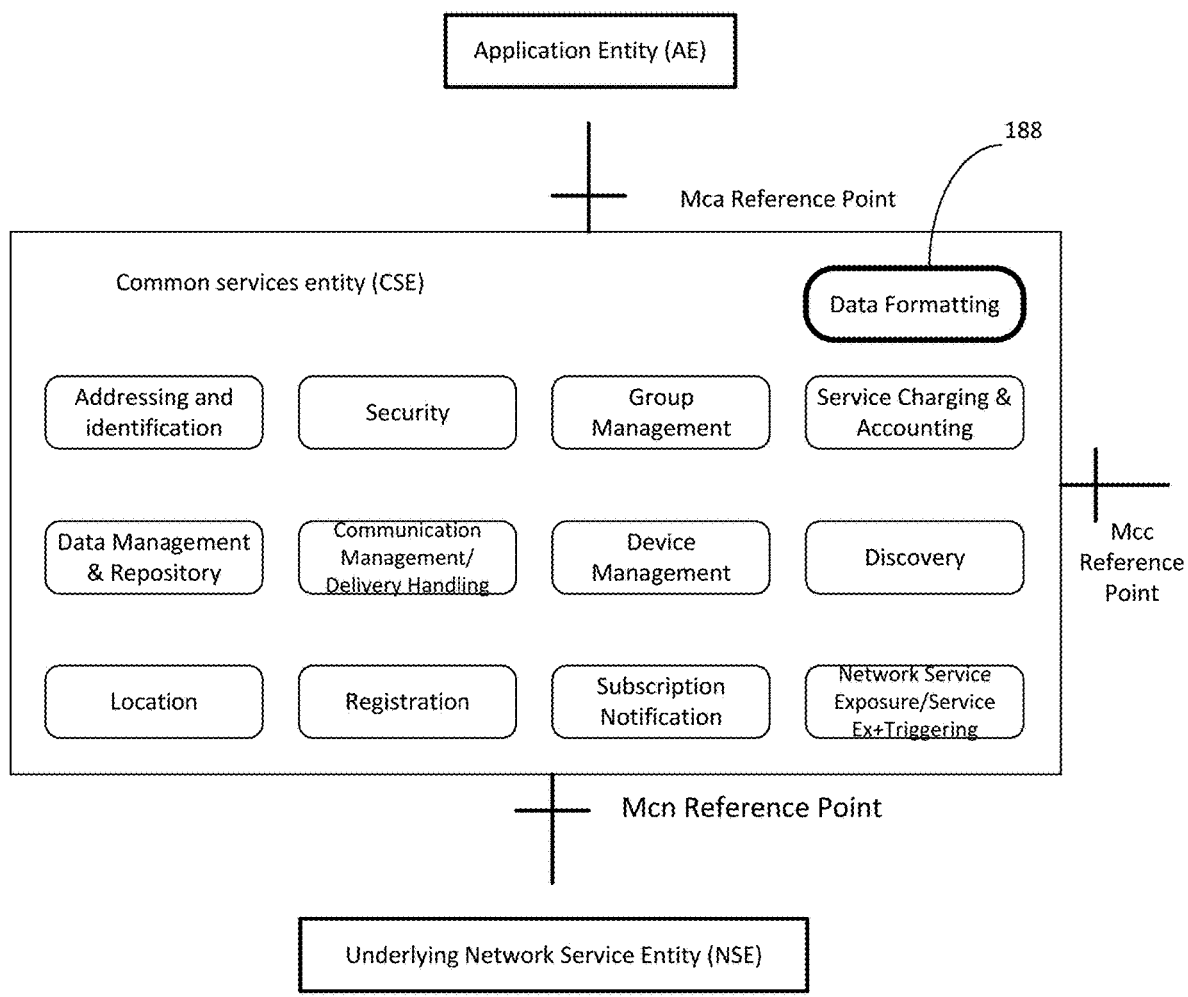
FIG. 15 illustrates an exemplary oneM2M architecture with data formatting CSF.

Below are methods described associated with FIG. 12 and FIG. 13, which may be initiated when a primitive arrives with the newly defined "semAccept," "semSuggest," or the like request attribute. The Data Formatting CSF 188 (FIG. 15) may perform the steps of FIG. 18.

Figure 18:
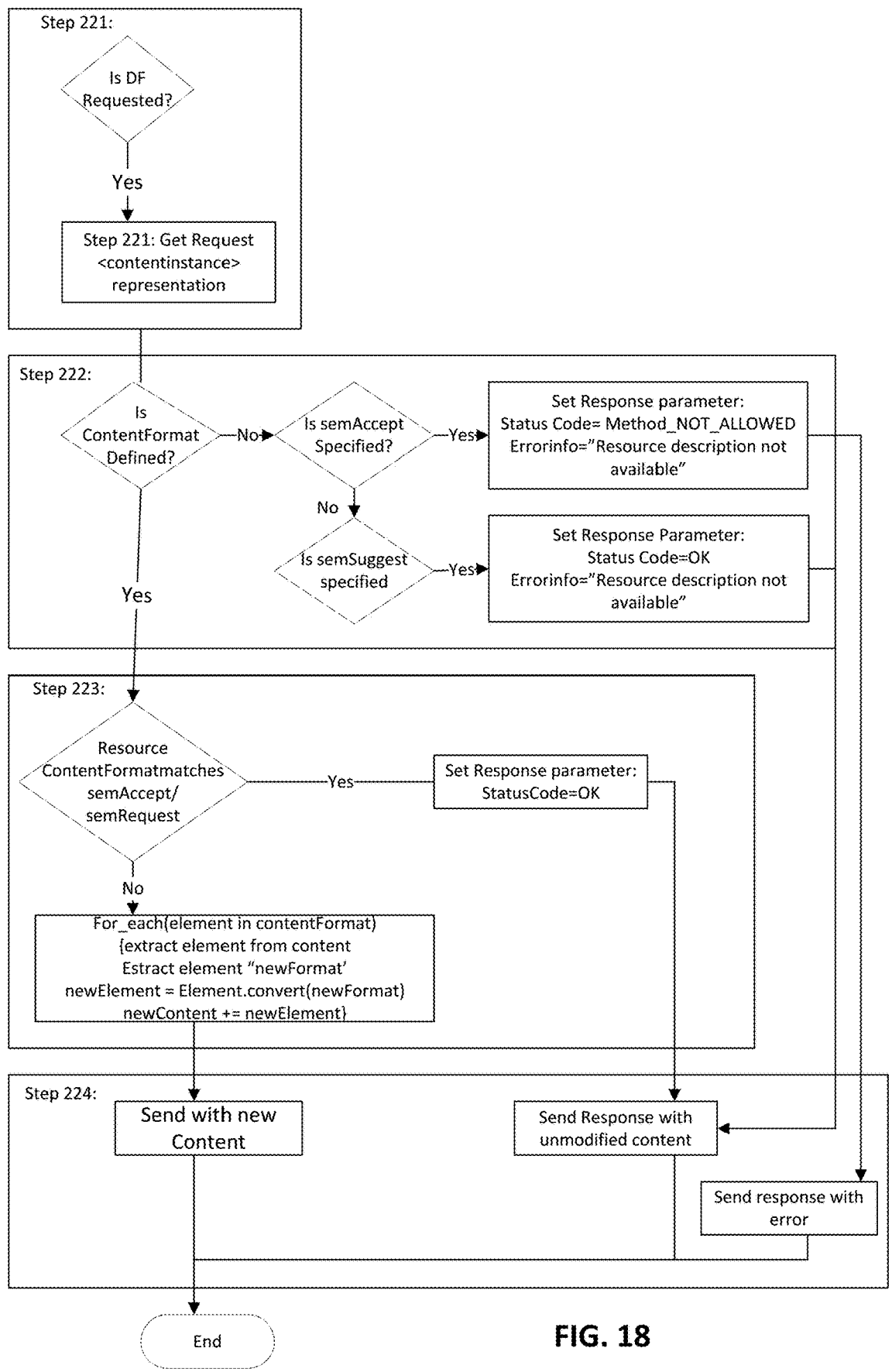
FIG. 18 illustrates an exemplary data formatting CSF method.

With reference to FIG. 18, when a <contentInstance> resource is retrieved, the DF CSF checks the target resource <semanticDescriptor> content. At step 221, there is a determination if Data Formatting Service is requested. For example, data conversion is requested when one of the following request primitive attributes is present semAccept or semSuggest. So if yes, then data formatting CSF 188 gets the <contentInstance> resource indicated by the "To" field from the data repository. At step 222, data formatting CSF 188 determines if Data Conversion is required and possible. Data Conversion is possible or available if the ContentFormat is specified. If the ContentFormat is not specified in the target resource the response can be based on the request type. For example, return the original content if "semSuggest" is specified. This means that content should be returned, even if it is not in the desired format. Another example, return an error response if "semAccept" is specified. This means that the content should not be provided if it cannot be converted.

With continued reference to FIG. 18, at step 223 data formatting CSF 188 creates converted content. If the ContentFormat of the <contentInstance> is the same as the ContentFormat specified in the request, no conversion is needed. If the ContentFormat of the <contentInstance> is NOT the same as the ContentFormat specified in the request, then convert. Data formatting CSF 188 may use the ContentFormat specified in the request to extract each requested format, truncate data that is not in the specified ContentFormat, convert data this is not in the specified ContentFormat, add additional data, using <contentInstance> resource attributes, reorder Content according to request ContentFormat, or use the ContentFormat description of the <contentInstance> to extract each data element. Conversion errors may be handled according to the request type as described in step 222. At step 224, data formatting CSF 188 sends response according to the results of step 221 through step 223. If conversion was successfully performed, then: 1) response status code OK; and 2) content=<convertedResource>. If conversion was not required because "semSuggest" was used, the ContentFormat was a match, or a conversion error occurred, then: 1) response status code OK; and 2) content=<unmodifiedResource>. If conversion was unsuccessful because "semAccept" was used, the resource did not have ContentFormat specified, or a conversion error occurred, then: 1) response status code ERROR; and 2) content=none.

Figure 19:
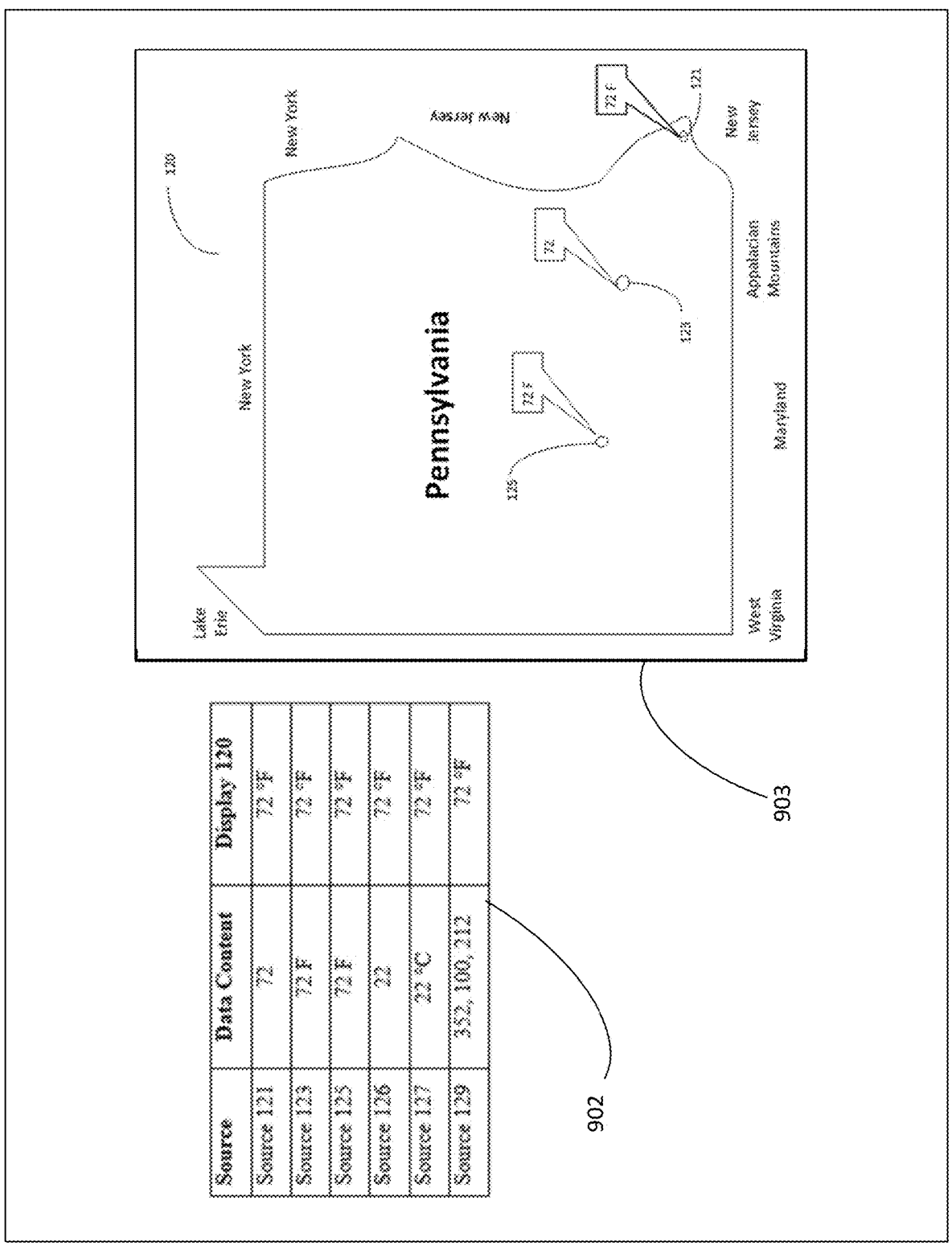
FIG. 19 illustrates an exemplary display (e.g., graphical user interface) that may be generated based on the methods and systems discussed herein.

FIG. 19 illustrates an exemplary display (e.g., graphical user interface) that may be generated based on the methods and systems discussed herein. Display interface 901 (e.g., touch screen display) may provide text in block 902 associated with semantics based content specification, such as the parameters of Table 3 through Table 24. In another example, progress of any of the steps (e.g., sent messages or success of steps) discussed herein may be displayed in block 902. In addition, graphical output 903 may be displayed on display interface 901. Graphical output 903 may be the topology of the devices on a map, a graphical output of the progress of any method or systems discussed herein, or the like.

FIG. 20A is a diagram of an example machine-to machine (M2M), Internet of Things (IoT), or Web of Things (WoT) communication system 10 in which one or more disclosed concepts of semantics based content specification may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 20B, the illustrated M2M service layer 22 (e.g., service layer 132 as described herein) in the field domain provides services for the M2M application 20 (e.g., application 131), M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 20B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using semantics based content specification, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The semantics based content specification of the present application may be implemented as part of a service layer. The service layer (e.g. service layer 132) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the semantics based content specification of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the semantics based content specification of the present application can be implemented as part of an M2M network that uses a Service Oriented Architecture (SOA) or a resource-oriented architecture (ROA) to access services such as the semantics based content specification of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

FIG. 20C is a system diagram of an example M2M device 30, such as an M2M terminal device 18 (e.g., sensor 133) or an M2M gateway device 14 (e.g., service layer 132) for example. As shown in FIG. 20C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., service layer 132, application 131, sensor 133, and others) may be an exemplary implementation that performs the disclosed systems and methods for semantics based content specification.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 20C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 20C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the semantics based content specification in some of the examples described herein are successful or unsuccessful (e.g., format requests, conversions, etc.), or otherwise indicate a status of semantics based content specification and associated components. The control lighting patterns, images, or colors on the display or indicators 42 may be reflective of the status of any of the method flows or components in the FIGS. illustrated or discussed herein (e.g., FIG. 11 through FIG. 14, FIG. 16, FIG. 17, etc). Disclosed herein are messages and procedures of semantics-related resources management as well as resource semantics information management. The messages and procedures can be extended to provide interface/API for users to request resource-related resources via an input source (e.g., speaker/microphone 38, keypad 40, or display/touchpad 42) and request, configure, or query semantics information of resources, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 20D is a block diagram of an exemplary computing system 90 on which, for example, the M2M service platform 22 of FIG. 20A and FIG. 20B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for semantics based content specification, such as receiving semantic descriptors along with data content.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 20A and FIG. 20B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—semantics based content specification—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for semantics based content specification of Internet of Things data, such as sensor data. A method, system, computer readable storage medium, or apparatus has means for receiving a message comprising a request to retrieve a first measurement in a first format; receiving the first measurement and meta-data comprising format description of the first measurement; parsing the first measurement based on the format description; and converting the first measurement to the first format based on the parsing of the first measurement. The first measurement may be in a second format before the receiving of the message. The message may include a link to the first format. The formation description may include a value and a label. The format description may include information that identifies the value can be interpreted. The format description may include information that identifies the value as an integer. The apparatus may be a machine-to-machine gateway device. All combinations in this paragraph (including the removal or addition of steps) are contemplated in a manner that is consistent with the other portions of the detailed description.

What is claimed:

1. An apparatus comprising:
    a processor; and
    a memory coupled with the processor, the memory comprising executable instructions that when executed by the processor cause the processor to effectuate operations of a service layer comprising:
        receiving a first message from a first application to store first measurement data in a first format;
        storing the first measurement data in a first service layer resource;
        receiving a second message from a first application or a second application to create a content descriptor comprising rules for converting a format of one or more attributes, restructuring an order of one or more attributes, adding one or more attributes of measurement data stored by the apparatus, or removing one or more attributes of measurement data stored by the apparatus;
        storing the content descriptor in a second service layer resource;
        receiving a third message comprising a request to retrieve a measurement data stored in a first format in the first service layer resource and converting the measurement data to a second format that is different than the first format, wherein the request is from the second application, wherein the second message comprises a link to the content descriptor stored in the second service layer resource;
        based on the third message, accessing the first type of measurement data in the stored first format in the first service layer resource and accessing the linked content descriptor stored in the second service layer resource;
        parsing the measurement data in a stored first format;
        converting the stored format of one or more attributes, restructuring the order of one or more attributes, adding one or more attributes of measurement data, or removing one or more attributes of the measurement data based on the rules of the linked content descriptor; and
        returning a response to the second application comprising the measurement data in a second format.

2. The apparatus of claim 1, wherein the format description comprises information that identifies how the value can be interpreted based on a definition of the format description.

3. The apparatus of claim 1, wherein the format description comprises information that identifies the value as an integer.

4. The apparatus of claim 1, wherein the apparatus is a machine-to-machine gateway device.

5. A method comprising:
    receiving, by a device, a first message from a first application to store first measurement data in a first format;
    storing, by the device, the first measurement data in a first service layer resource;
    receiving a second message from a first application or a second application to create a content descriptor comprising rules for converting a format of one or more attributes, restructuring an order of one or more attributes, adding one or more attributes of measurement data stored by the apparatus, or removing one or more attributes of measurement data stored by the apparatus;
    storing, by the device, the content descriptor in a second service layer resource;
    receiving, by the device, a third message comprising a request to retrieve a measurement data in a first format in the first service layer resource and converting the measurement data to a second format that is different than the first format, wherein the request is from the second application, wherein the second message comprises a link to the content descriptor stored in the second service layer resource;
    based on the third message, accessing the measurement data in the stored first format in the first service layer resource and accessing the linked content descriptor stored in the second service layer resource;
    parsing the measurement data in a stored first format;
    converting the stored format of one or more attributes, restructuring the order of one or more attributes, adding one or more attributes of measurement data, or removing one or more attributes of the measurement data based on the rules of the linked content descriptor; and
    returning a response to the second application comprising the measurement data in a second format.

6. The method of claim 5, wherein the format description comprises information that identifies how the value can be interpreted based on a definition of the format description.

7. The method of claim 5, wherein the format description comprises information that identifies the value as an integer.

8. The method of claim 5, wherein the device is a machine-to-machine gateway device.

9. A computer readable storage medium storing computer executable instructions that when executed by a computing device cause said computing device to effectuate operations comprising:
    receiving a first message from a first application to store first measurement data in a first format;
    storing the first measurement data in a first service layer resource;
    receiving a second message from a first application or a second application to create a content descriptor comprising rules for converting a format of one or more attributes, restructuring an order of one or more attributes, adding one or more attributes of measurement data stored by the apparatus, or removing one or more attributes of measurement data stored by the apparatus;

storing the content descriptor in a second service layer resource;

receiving a third message comprising a request to retrieve a measurement data in a first format in the first service layer resource and converting the measurement data to a second format that is different than the first format, wherein the request is from the second application, wherein the second message comprises a link to the content descriptor stored in the second service layer resource;

based on the third message, accessing the measurement data in the stored first format in the first service layer resource and accessing the linked content descriptor stored in the second service layer resource;

parsing the measurement data in a stored first format;

converting the stored format of one or more attributes, restructuring the order of one or more attributes, adding one or more attributes of measurement data, or removing one or more attributes of the measurement data based on the rules of the linked content descriptor; and returning a response to the second application comprising the measurement data in a second format.

10. The computer readable storage medium of claim 9, wherein the format description comprises a value and a label.

11. The computer readable storage medium of claim 9, wherein the format description comprises information that identifies how the value can be interpreted based on a definition of the format description.

12. The computer readable storage medium of claim 9, wherein the format description comprises information that identifies the value as an integer.

* * * * *